May 28, 1968   R. A. BURGY ETAL   3,385,402
ELEVATOR FLOOR SPOTTING CONTROL RESPONSIVE TO A TIME CLOCK
Filed Oct. 31, 1956   10 Sheets-Sheet 1
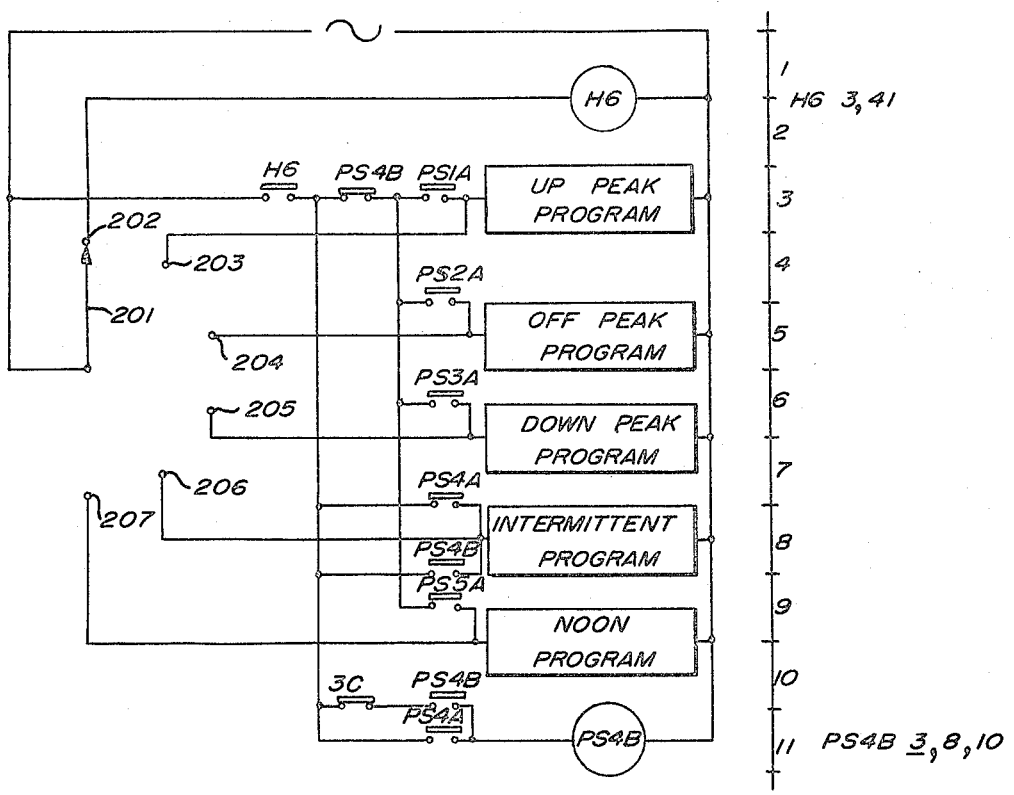
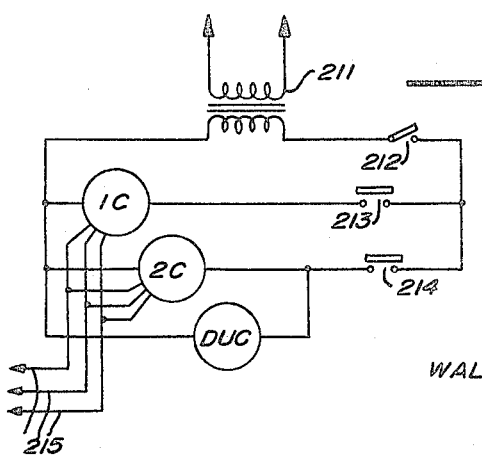
INVENTORS.
WALTER A. NIKAZY, RAYMOND A. BURGY
ERNEST B. THURSTON
BY
Marshall, Marshall & Yeasting
ATTORNEYS

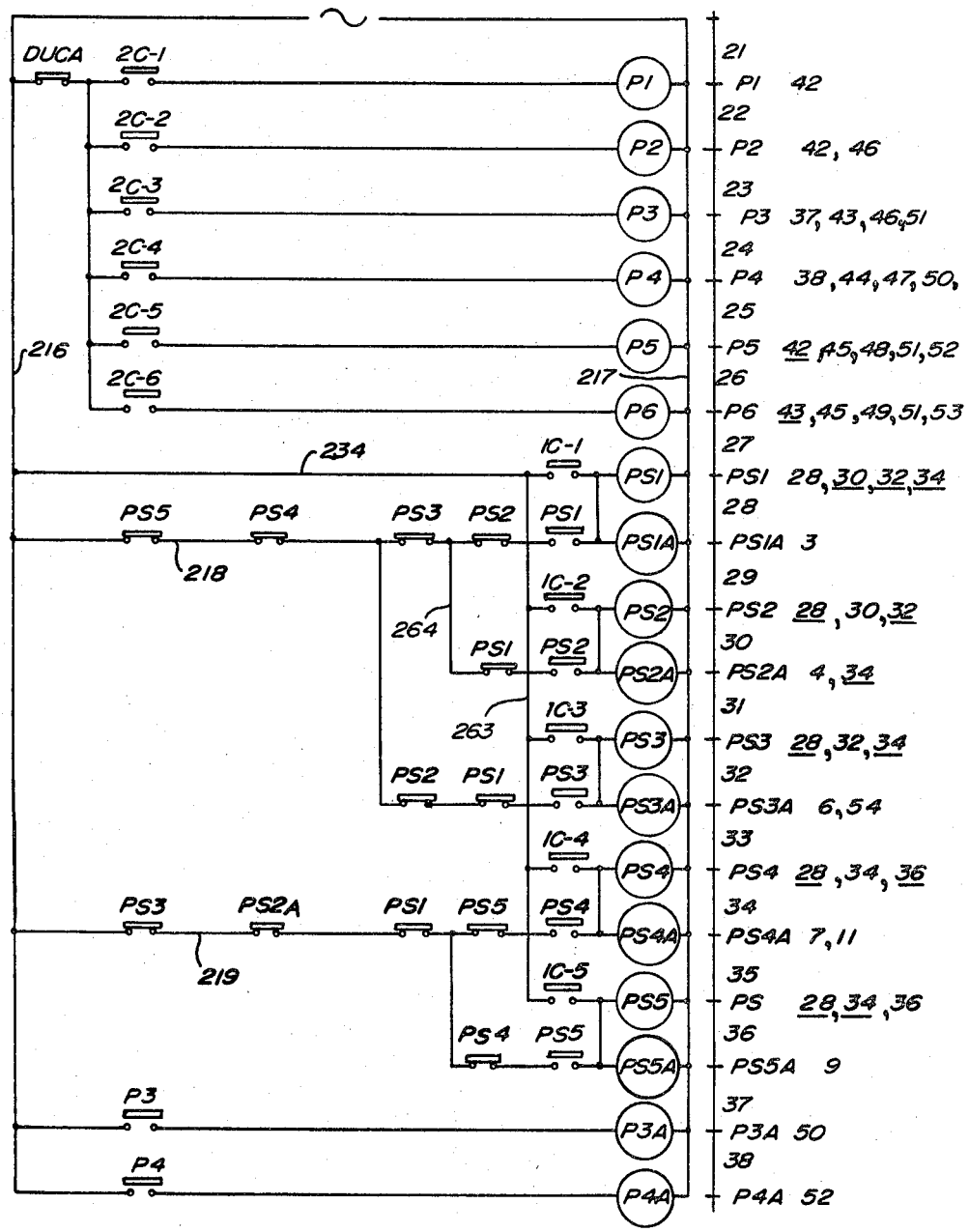
Fig. III

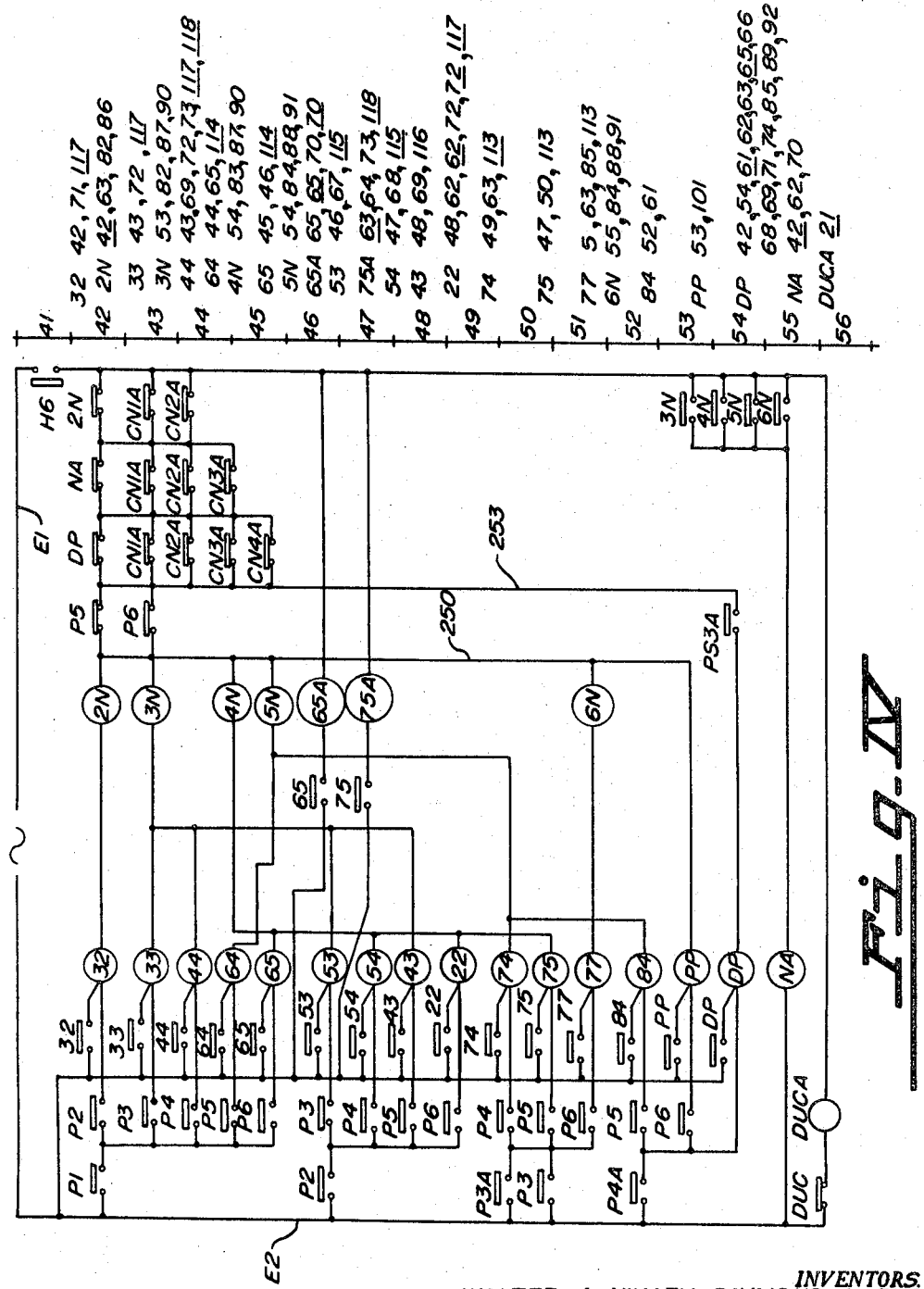

Fig. V

| TIME OF DAY | CLOCK OPERATED CONTACTS | | PROGRAM RELAYS | TRAFFIC PROGRAM SETUP | SPECIAL SERVICE PROGRAM | | | | | |
|---|---|---|---|---|---|---|---|---|---|---|
| | CLOCK NO. 1 | CLOCK NO. 2 | | | PARK AT FLOOR | DOORS OPEN | SERVICE ENDS | FLOOR NUMBER | CAR LOADS | CARS SERVING |
| 7:45 | 1 | | | UP PEAK | | | | | | |
| 8:00 | 2 | | | OFF PEAK | | | | | | |
| 11:00 | 3 | | | NOON | | | | | | |
| 11:14 | | 2,6 | 22-4N | | X | | | 3 | 1 | 2 |
| 11:15 | | 4,6 | PP | | | X | | | | |
| 11:18 | | 5,6 | | | | | X | 8 | 3 | 1,1,3 |
| 11:19 | | 3,4 | 74-5N | | X | | | | | 1,1 |
| 11:20 | | 4,6 | PP | | | X | | 7 | 5 | 2,2 |
| 11:23 | | 3,6 | | | | | X | | | 3 |
| 11:24 | | 4,5 | 84-5N | | X | | | | | 1,1 |
| 11:25 | | 4,6 | PP | | | X | | 8 | 5 | 2,2 |
| 11:28 | | 5,6 | | | | | X | | | 3 |
| 11:34 | | 1,5 | 64-5N | | X | | | | | 1,1 |
| 11:35 | | 4,6 | PP | | | X | | 6 | 6 | 2,2 |
| 11:38 | | 5,6 | | | | | X | | | 3 |
| 11:39 | | 1,6 | 65-3N | | X | | | 4 | 1 | 2 |
| 11:40 | | 4,6 | PP | | | X | | 6 | 3 | 1,1 |
| 11:43 | | 5,6 | | | | | X | | | 3 |
| 11:34 | | 2,4 | 54-4N | | X | | | | | 1,1 |
| 11:55 | | 4,5 | PP | | | X | | 5 | 4 | 2 |
| 11:58 | | 5,6 | | | | | X | | | 3 |
| 11:59 | | 2,3 | 53-3N | | X | | | | | 1 |
| 12:00 | | 4,6 | PP | | | X | | 5 | 3 | 2 |
| 12:03 | | 5,6 | | | | | X | | | 3 |
| 12:04 | | 2,5 | 43-3N | | X | | | | | 1 |
| 12:05 | | 4,6 | PP | | | X | | 4 | 3 | 2 |
| 12:08 | | 5,6 | | | | | X | | | 3 |
| 12:09 | | 2,5 | 43-3N | | X | | | | | 1 |
| 12:10 | | 4,6 | PP | | | X | | 4 | 3 | 2 |
| 12:13 | | 5,6 | | | | | X | | | 3 |
| 12:19 | | 1,2 | 32-2N | | X | | | | | 1 |
| 12:20 | | 4,6 | PP | | | X | | 3 | 2 | 2 |
| 12:23 | | 5,6 | | | | | X | | | |
| 12:24 | | 1,3 | 33-3N | | X | | | | | 1 |
| 12:25 | | 4,6 | PP | | | X | | 3 | 3 | 2 |
| 12:28 | | 5,6 | | | | | X | | | 3 |
| 12:29 | | 1,4 | 44-3N | | X | | | 3 | 2 | 1,3 |
| 12:30 | | 4,6 | PP | | | X | | | | |
| 12:33 | | 5,6 | | | | | X | 2 | 1 | 2 |
| 12:34 | | 3,5 | 75-4N | | X | | | 7 | 3 | 1,1,3 |
| 12:35 | | 4,6 | PP | | | X | | | | |
| 12:38 | | 5,6 | | | | | X | 2 | 1 | 2 |
| 12:39 | | 3,6 | 77-6N | | X | | | | | 1,1 |
| 12:40 | | 4,6 | PP | | | X | | 7 | 6 | 2,2 |
| 12:45 | | 5,6 | | | | | X | | | 3,3 |
| 1:30 | 2 | | | OFF PEAK | | | | | | |
| 4:44 | 3 | 4 | DP | DOWN PEAK | X | | | 5 | 4 | 1,1,1 |
| 4:45 | | 4,6 | PP | | | X | | 8 | 5 | 2,2,2,2 |
| | | | | | | | | 6 | 3 | 3,3,3 |
| 5:00 | 4 | 5,6 | | INTER. | | | X | 7 | 6 | 4,4,4,4,4 |

INVENTORS
WALTER A. NIKAZY, RAYMOND A. BURGY
ERNEST B. THURSTON

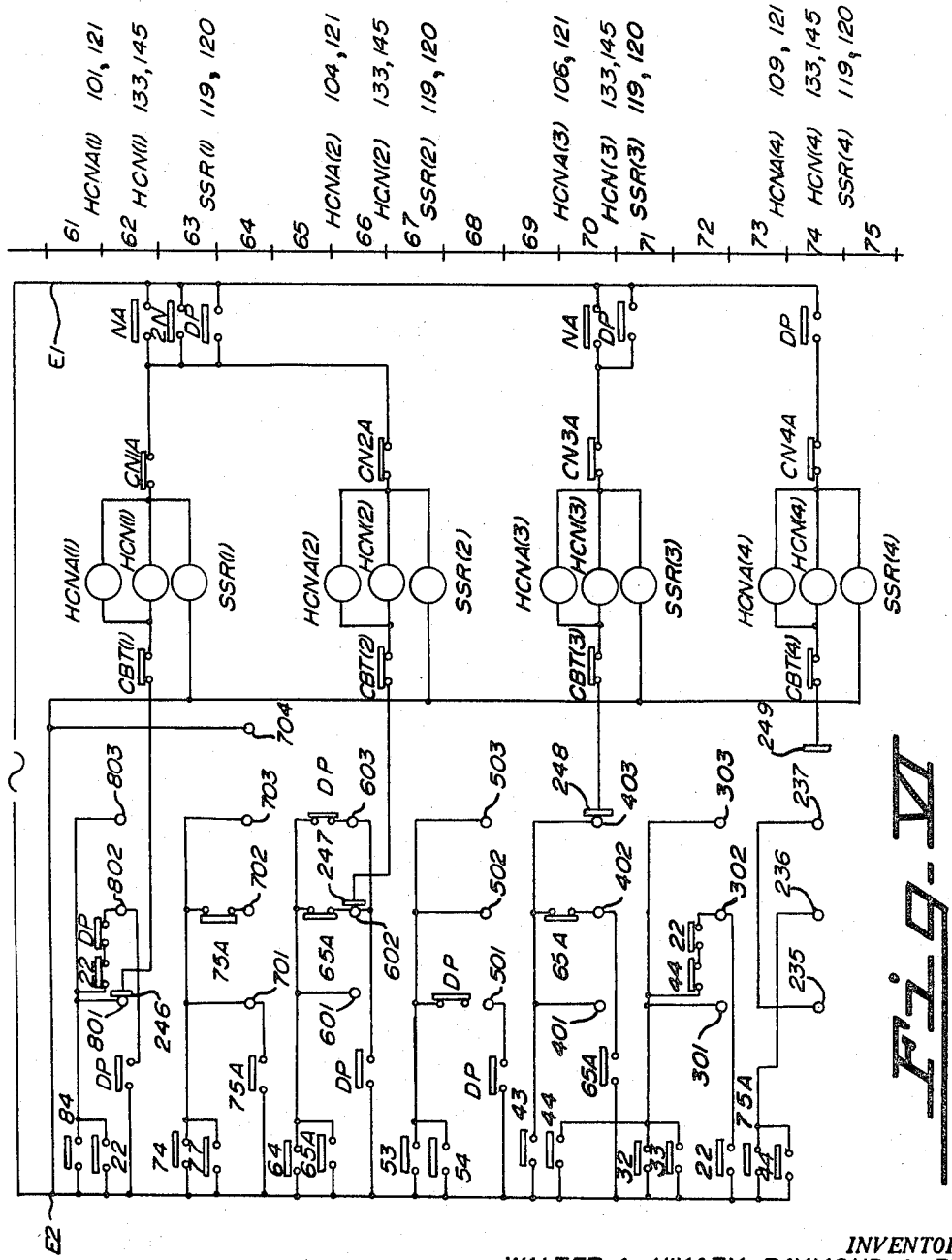

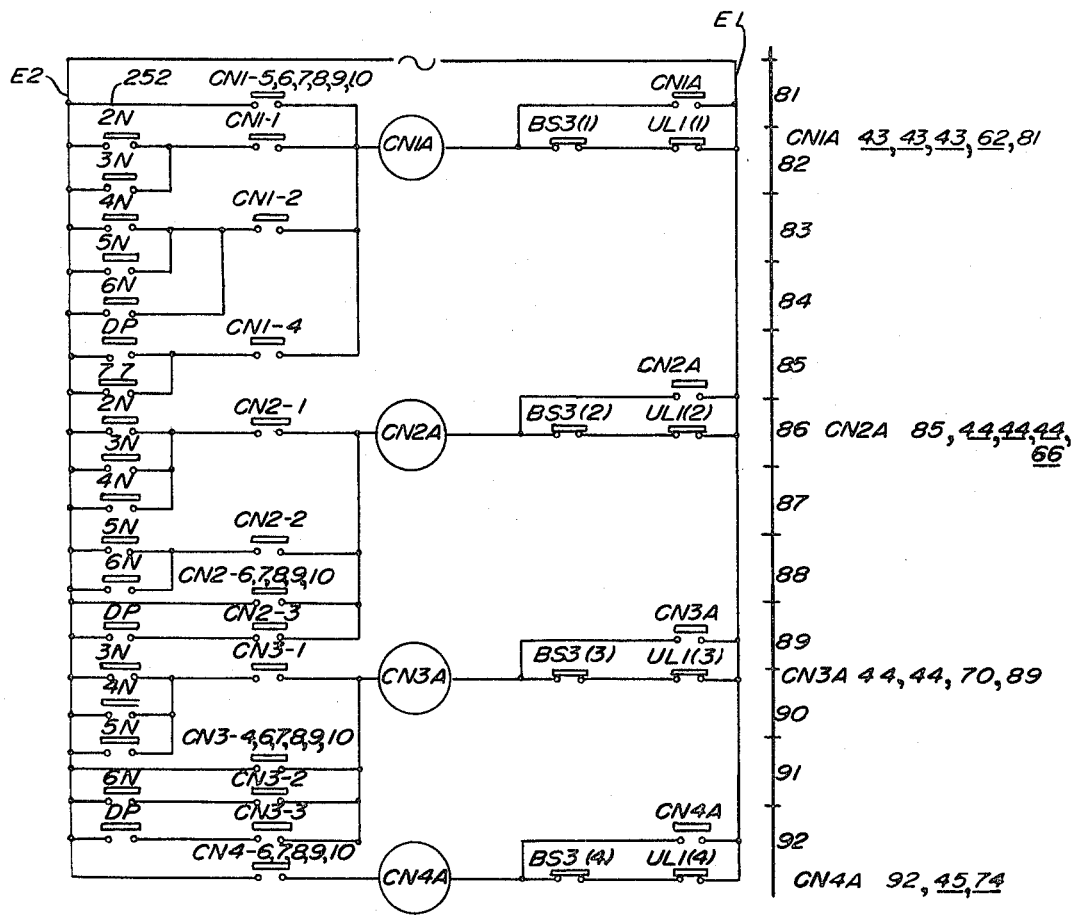
Fig. VII

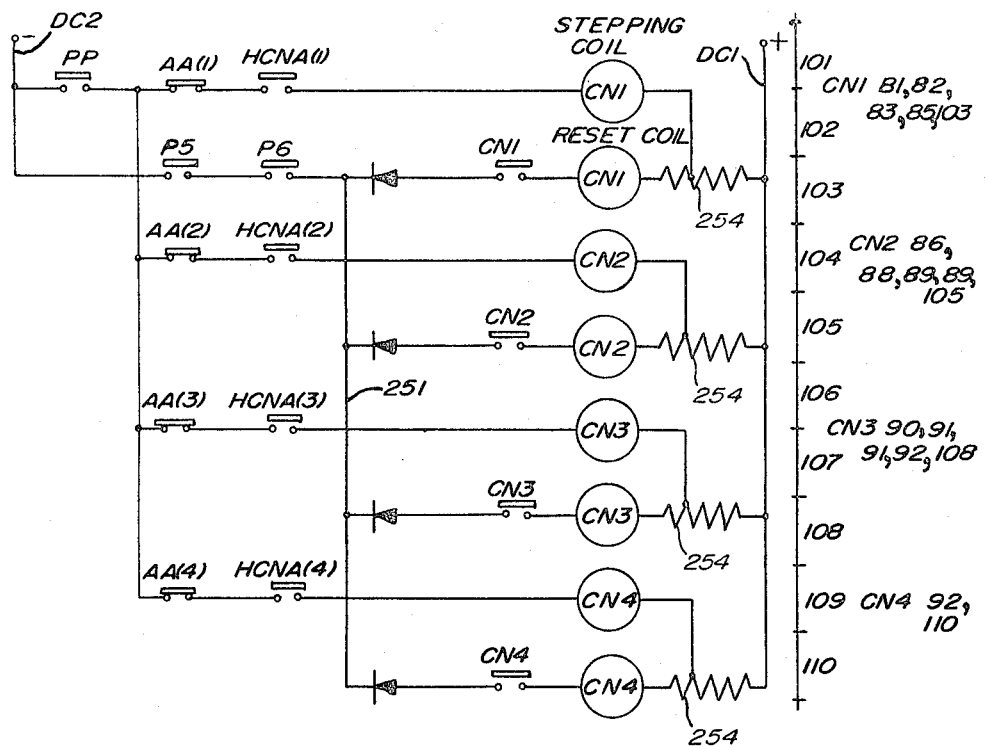
_Fig-VIII_
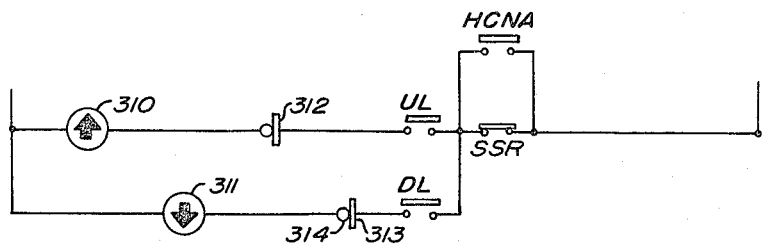
_Fig-X_

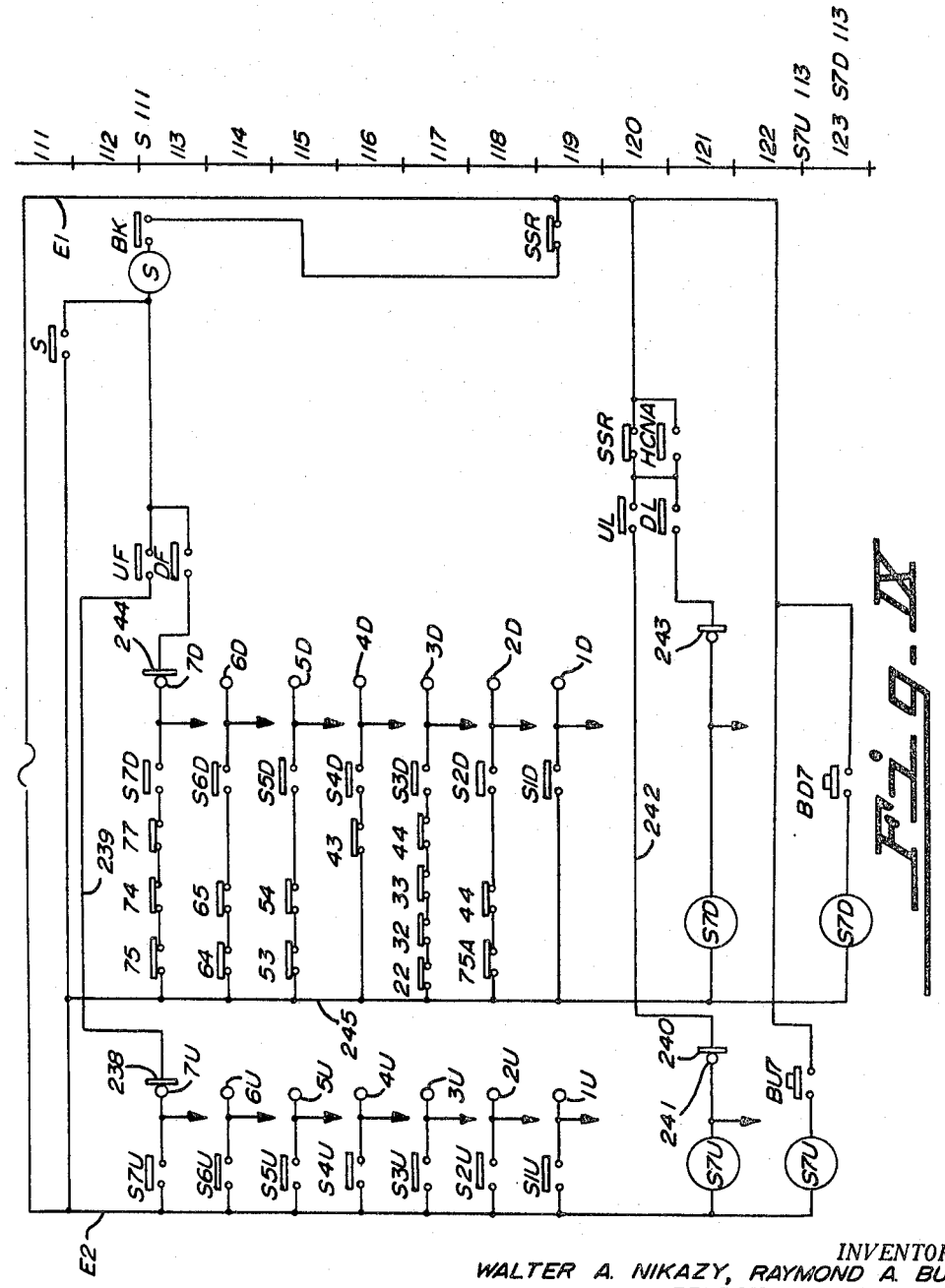

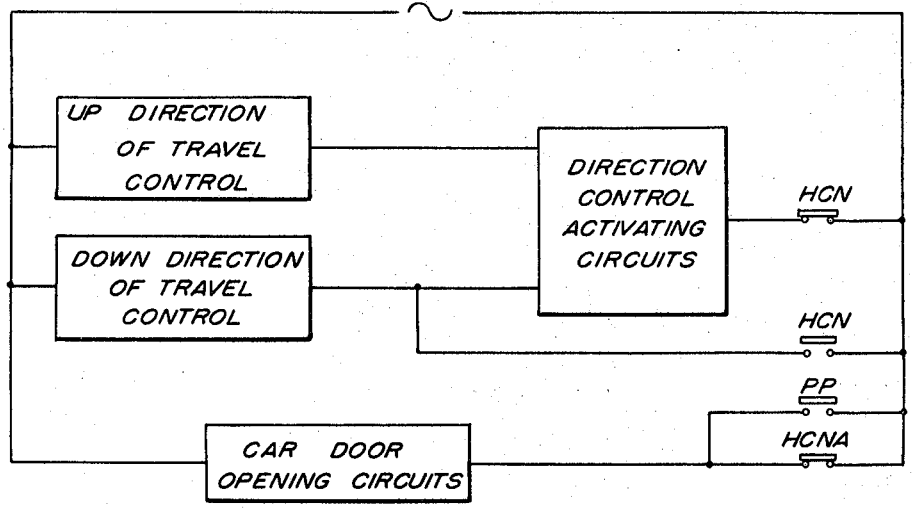
Fig. XI
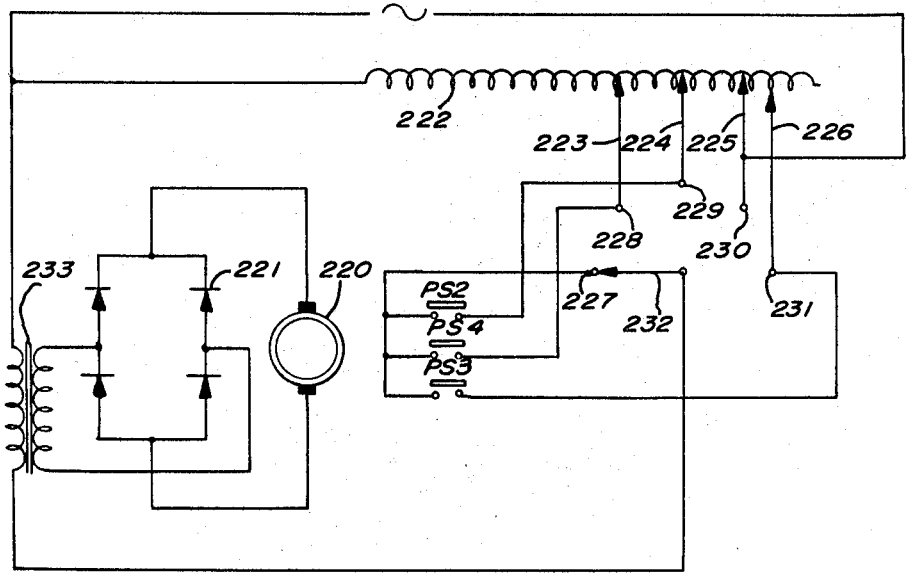
Fig. XII
INVENTORS.
RAYMOND A. BURGY
ERNEST B. THURSTON
BY WALTER A. NIKAZY
Marshall, Marshall & Yeasting
ATTORNEYS

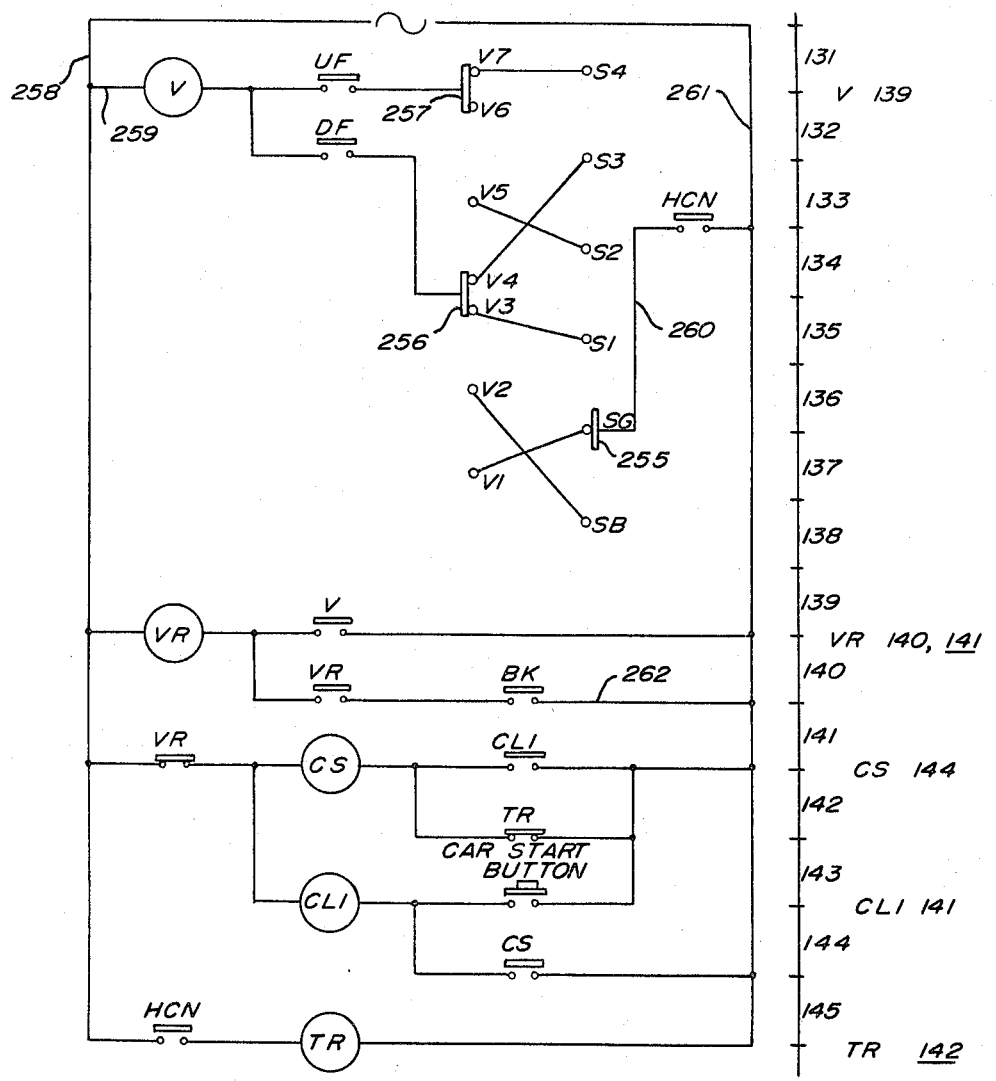

United States Patent Office 3,385,402
Patented May 28, 1968

3,385,402
ELEVATOR FLOOR SPOTTING CONTROL
RESPONSIVE TO A TIME CLOCK
Raymond A. Burgy, Maumee, and Walter A. Nikazy and
Ernest B. Thurston, Toledo, Ohio, assignors to Toledo
Scale Corporation, a corporation of Ohio
Filed Oct. 31, 1956, Ser. No. 619,575
48 Claims. (Cl. 187—29)

This invention relates to elevator signal and control systems and more particularly to the unattended automatic operation of one or more elevator cars and to means for attaining such operation.

Heretofore numerous elevator systems have offered automatic control features which included several modes of operation, each calculated to best satisfy the demands for service within the capabilities of the system. Often these systems had a number of programs of operation which could be selected manually as by a dispatcher or automatically in response to a predetermined demand for service such as the number of car or hall calls, the number of cars in service in a bank of elevators, the interval over which the calls were registered, or combinations of these factors. It is also known to alter car distribution and service with the hour of the day, particularly where a fixed pattern of demand for service over a given interval such as twenty-four hours or seven days can be established.

The programs of service automatically introduced in prior elevator systems have been general in nature. They involved subjecting the cars to dispatching from the terminal at which the greatest demand existed with rapid return to that terminal at the end of a trip, service to a restricted zone or group of floors, special preference to hall calls which have remained unanswered for greater than a predetermined interval, and the like. These prior techniques have given less than satisfactory service in certain instances particularly where sharp peaks in service demand are experienced.

It has often been necessary to supersede the automatic controls for elevators by placing the cars under the control of individual attendants to meet certain peak demands or permit the quality of service to deteriorate excessively during those peaks. For example, many automatic systems are dominated during peak conditions by calls at the first floors served so that those floors normally served later in the car travel are served only after the floors first served have no more traffic. In such instances, often resort is had to the expedient of attendants who exercise discretion in equitably distributing service. This expedient greatly diminishes the value of automatic controls and merely distributes the delays in service more evenly among the passengers at the various floors.

An object of the present invention is to improve the service provided by automatic elevators.

Another object is to distribute the service during periods of peak demand.

Another object is to expedite the service provided by automatic elevators while increasing the efficiency of their utilization.

Other objects are to anticipate demands for service and condition a car or cars to be available without delay as the demand arises, to utilize only as many cars as are warranted for service at a given floor during demand peaks, to provide preferential or special service to preselected floors at certain times of the day, to provide general and preferential service concurrently, and to isolate the general and preferential service to an appreciable degree whereby both are effectively utilized.

These objects are realized by this invention in an elevator system operating without attendants by providing the system with means responsive to a clock, advantageously the building master clock, which in anticipation of an up-surge in traffic from a particular floor or floors disables the hall call responsive mechanism of certain cars. These cars are permited to fulfill their current service demands by continuing to respond to car calls until all have been satisfied. When a car has answered all car calls, usually within a minute of the disabling of hall calls, it is parked at an assigned floor with its doors closed. At the instant the prospective passengers are anticipated, for example when a master clock synchronized with control timers for the system indicates a work period for the personnel served at that landing is completed, the door of the car opens to receive them. Upon the registration of a car call, usually for the lower dispatching terminal, the car initiates its travel toward that terminal. The loaded car is permitted to respond to car calls while traveling in that direction. When it reaches its destination, it can be returned to an assigned floor disregarding hall calls. After serving an assigned floor a predetermined number of trips calculated to relieve the demand, the car is returned to normal service.

Complete flexibility as to the floors to be given special service, the cars assigned to those floors, and the number of trips a car will make to a given floor or floors is provided in the present system. Thus, one or more cars can be assigned to a single floor. Further, the cars may offer a single trip or a plurality of trips to that floor so that one car might make one special service trip to a floor while another is required to make several to that floor. They also can be arranged to give special service to several floors, for example with two cars serving one floor and single cars serving several other floors.

This scheme of operation can be enhanced by a number of refinements to further facilitate service. These include a means which prevents the initiation of the clock controlled service cycle until the demands for service attain a certain level, whereby the cars will not be placed in operation and the preferential service controls will remain dormant when the demand is insufficient to warrant their use. Thus, a standard daily cycle employing all cars and offering preferential service at certain periods will not be introduced on holidays and weekends. Utilization of a car by passengers who might enter from other than the floor being given special service can be discouraged by appropriate signals as by failing to operate the direction indicators for the cars at other than the selected floor. When a car is delayed excessively while providing special service, the condition can be rectified by returning it to regular service upon the expiration of an interval of sufficient length to enable it to complete its assigned function under normal operation.

The program also can be arranged to provide conventional service by one or more cars while special service is being given by others. In such an instance, the car reserved for general service can be made to better serve those floors which have been given no preferred service by preventing it from serving the preferred floor or floors.

In accordance with the above, one feature of this invention resides in means selecting and assigning an elevator car to provide preferred service for a given floor at certain times as determined by a timing mechanism. This feature can also be subject to certain demands for service.

Another feature involves means which distribute the cars in a bank of elevators at certain periods according to an established demand pattern so that the cars are available at the locations of greatest need at the instant the demand arises.

A third feature includes assigning a car to serve a given floor in a preferred manner for a predetermined number of trips. The number of trips may be chosen to best suit the need according to this feature, and upon providing the predetermined amount of service or the expiration of a reasonable interval, which ever occurs first, the car can be returned to normal service.

A fourth feature resides in preparing the cars for preferred service by continuing their service for current passengers while avoiding the acquisition of additional passengers. In particular a car assigned or conditioned for special service may have its hall call responding controls disabled.

A fifth features involves means controlling the call registering and service indicating means whereby those cars functioning under special service can respond to car calls while discouraging the patronage of passengers at other than the preferred floor. Operation incidental to this feature is realized without canceling the hall calls registered by those intending passengers.

A further feature includes means for introducing the automatic service cycle when the system is set for such service only when the demand reaches a level indicating that the controlled cycle is warranted. In the absence of such a demand, as where the number of calls for service is insufficient to bring more than two cars into service, the timing means does not obtain control of the system and the remaining cars have their lifting motors, and signal and control systems shut down.

The above and additional objects and features of this invention will become apparent from the following detailed description when read in conjunction with the accompanying drawings wherein:

FIG. I is an across the line diagram, in simplified schematic form, of a program controller for a group of elevators in an elevator system of a type to which the present invention can be applied;

FIG. II is a timing mechanism which can be employed to establish an operating cycle for an elevator control system according to this invention;

FIG. III is an across the line circuit diagram of the clock controlled relays which institute and terminate the various preferential service program steps in the operation of an elevator system according to this invention;

FIG. IV is an across the line circuit diagram of certain of the circuits subject to the operation of the circuits of FIG. III to select the cars and to establish the pattern of car travel for a multicar system;

FIG. V is a chart setting forth the car service pattern of the illustrative embodiment of this invention;

FIG. VI is an across the line diagram showing the special service stopping contacts of the floor selector machines in the illustrative four car bank and the circuits which release the cars for normal service when they have completed their special service;

FIG. VII is an across the line diagram showing portions of the circuits which terminate special service when the required number of trips have been made by the cars;

FIG. VIII is an across the line diagram of the trip counting circuits for special service for the several cars;

FIG. IX is an across the line diagram of a fragment of the landing signal controls including the contacts of the floor selector machine for a representative car in the present system;

FIG. X is a fragment of a car travel indicator means showing the pertinent features of this invention as applied thereto;

FIG. XI is a block diagram of the means for setting the direction of travel for a car assigned to special service and means for controlling the car door movement while the car is assigned;

FIG. XII is a simplified schematic diagram of a dispatch timer motor showing the means for altering its speed and thus the dispatch interval in accordance with the timer control of this system; and FIG. XIII is a fragmentary schematic diagram of the individual car stopping circuits of this invention.

Each of the above described across the line diagrams of the circuits illustrating the present invention have been provided with marginal keys. These keys appear in columns to the right of the diagrams and represent, from left to right, the designation of the horizontal zone across the diagram within which the contact or actuating coil is located, the reference character for the coil located in the circuit in horizontal alignment therewith, and, horizontally adjacent the character, the line location of the contacts actuated by energizing the coil represented thereby. This key also indicates the nature of the contact operation, those contacts which have their line locations underlined being closed when the actuating coil is deenergized and opened when the coil is energized while those which are not underlined are closed by energizing the actuating coil. In the drawings the actuating coils are identified with reference characters within circles and the contacts actuated by those coils are assigned the identical characters positioned adjacent the contacts.

The following description is intended as merely illustrative of the mode of operation and means of attaining the operation contemplated by this invention. It is to be understood that this invention is applicable to many forms of elevator systems and that certain of its aspects even might be employed in a single car installation although in general the features are most advantageously incorporated in multicar operatorless elevator systems. Since the system is primarily concerned with dictating the location of the cars at specific periods, however, it is also applicable where the operation is only partially automatic and operators are relied on for certain functions such as closing the hoistway and car doors and the starting of the cars in response to appropriate signals.

In the multicar system described below the circuits represented in FIGS. I, II, III, IV, VII, and VIII are portions of the control common to all cars and include means for selecting individual cars. Those elements which are individual to the cars are shown in duplicate in these circuits. FIGS. IX, X, XI, XIII are of circuits which are individual to the cars and therefore are duplicated for each car intended to function in accordance with this invention. These duplicated circuits are connected in parallel or multiple in some instances as, for example, in the hall call circuits of FIG. IX at those lines terminated in arrowheads.

It is to be appreciated that the invention is applicable to a wide variety of elevator systems and accordingly the system in which it is illustrated has been shown only to the extent necessary to show the cooperative relationship with the invention. Wherever possible the known elements of the system have been shown in block diagram form and where circuits are duplicated as in hall call and hall call reset circuits at the bottom of FIG. IX and the travel indicator circuits of FIG. X only a single representative circuit is shown. As employed in practice, this invention is combined with a conventional elevator system including lifting motors and machines for each car, hall call and car call registering and control means, safety circuits and apparatus for the cars and system as a whole, motor controllers for starting and stopping the cars in their travel along the hoistway, dispatching machinery and service demand sensing equipment all of forms well known and used in the art.

The chosen illustration has been assumed to employ a floor selector machine for each car which is connected to the control system and the lifting motor for the car. These floor selectors may be of several well known constructions. For convenience it will be assumed that the selector includes a number of vertical lanes of contacts arranged adjacent each other so that individual contacts in each lane function in similar control circuits for the car while it is positioned at individual floors. Accordingly, the contacts of the various lanes which function while the car is at a common floor are aligned in horizontal rows. A crosshead extends horizontally across the contacts and is arranged for vertical movement along the contact lanes. Crosshead movement corresponds to car movement so that the crosshead is positioned opposite the row of contacts corresponding to the floor which the moving car is approaching or at which the stationary car is located. A brush arranged to pass along each lane of contacts is carried by the crosshead whereby the contacts for the various circuits are engaged by corresponding brushes as the crosshead advances in response to car operation. Included among the circuits which may employ connections established by operation of the floor selector are car signal circuits (not shown), hall signal circuits, hall signal reset circuits, high call reverse circuits (not shown), car travel or positioned indicating circuits, load limiting circuits, and others providing special functions in accordance with car position. Contacts of floor selector machines are shown in FIGS. VI, IX, and X, FIG. VI showing a single lane of contacts from each of the four floor selector machines of the four cars in the group illustrated.

In order to facilitate an appreciation of the invention the principal elements shown in the drawings will be listed by their reference characters and names, the lists being set forth in alphabetical and numerical order of the reference characters and being separated into two groups including those relays having actuating coils shown and those having only contacts shown.

The first group including illustrated actuating coils comprises:

CLI—door closing relay
CN1 through CN4—car trip counting relays for cars 1 to 4
CN1A through CN4A—trips completed relays for cars 1 to 4
CS—car switch relay
DP—down peak relay
DUC—clock contact energizing relay
DUCA—auxiliary clock contact energizing relay
H6—automatic program relay
HCN(1) through HCN(4)—special service stopping relays for cars 1 to 4
HCNA(1) through HCNA(4)—special service stopping relays for cars 1 to 4
NA—required car load relay
P1 through P6—auxiliary clock control relays
P3A and P4A—auxiliary clock control relays
PP—special service door open relay
PS1 through PS5—program selection relays
PS1A through PS5A—auxiliary program selection relays
PS4B—auxiliary program selection relay
S—hall signal stopping relay
S1D through S7D—down hall signal relays for floors 1 to 7
S1U through S7U—up hall signal relays for floors 1 to 7
SSR(1) through SSR(4)—special service relays for cars 1 to 4
TR—starting time relay
V—advance motor stopping relay
VR—advance motor stopping relay
1C—clock #1
2C—clock #2
2N through 6N—required car load relays
22 to 84—floor trip relays
65A and 75A—auxiliary floor trip relays Those contacts having no actuating coils shown include:

AA(1) through AA(4)—acceleration relays for cars 1 to 4
BK—brake relay
BP—signal by-pass relay
BS3(1) through BS3(4)—basement service control relay
CBT(1) through CBT(4)—car signal direction relay
DF—down field relay
DL—down direction determining relay
UF—up field relay
UL—up direction determining relay
3C—three car relay Where the above reference characters are followed by a dash and a number it represents a particular contact of a plurality of actuated by the operating element. As an example, 1C–1 is the number one contact of six on the number one clock. Similarly, CN1–5, 6, 7, 8, 9, 10 is a contact or parallel group of contacts on the car trip counting relay number one which is operated by the fifth through tenth counts of that relay.

FIG. V offers an additional aid to an appreciation of the invention in the form of a chart setting forth a typical operating program for an office building of the type employed to illustrate the invention. The chart shows the functions of the system as related to the time of day. Time is set forth in the vertical column to the extreme left and the elements operated and functions performed at that time are indicated at positions in horizontal alignment with the particular time and in appropriately labeled vertical columns.

The major programs are set forth in the column entitled "Traffic Program Setup." These programs are introduced at appropriate instants by the operation of corresponding contacts on a first timer as listed in the column entitled "Clock Operated Contacts—Clock No. 1" and remain in effect until another contact of that clock is closed. Thus, the noon program is brought into operation by contact number 5 of clock number 1 at 11:00 p.m. and is maintained until replaced by the off peak program, introduced by the operation of contact number 2 of clock number 1 at 1:30 p.m.

Subprograms available during the major programs are also illustrated in the chart with reference to time. Generally, these subprograms are instituted and altered by closing a pair of contacts on clock number 2 as identified by numbers in the third column from the left labeled "Clock Operated Contacts—Clock No. 2." Operation of clock number 2 causes the system to perform the functions listed in the right hand group of columns under the major heading "Special Service Program." The three columns to the left under that major heading indicate the function performed by the system and the three to the right indicate the floors to which cars are assigned for special service, in the column labeled "Floor Number," the cars assigned to the floors, in the column labeled "Cars Serving," and the number of trips the assigned car or cars are set to make during an interval of assignment, in the column labeled "Car Loads." When two floors are given special service during an interval, the number of loads assigned and the cars for the repsective floors are shown horizontally aligned with the respective floors. Where a single car is assigned for a plurality of loads, its number is set forth a corresponding number of times in the "Cars Serving" column. Those relays instrumental in conditioning the system for the special service program in response to the operation of the clock contacts are identified in the forth column from the left labeled "Program Relays."

The significance of the chart of FIG. V in plotting the operation of a subprogram is illustrated by reference to the period from 11:39 to 11:43. During that period, as indicated in the three right hand columns, car number 2 is assigned to make one trip downward from the fourth floor, car number 1 is assigned to make two trips downward from the sixth floor, and car number three is assigned to make one trip from the sixth floor. In preparation for this service, at 11:39, cars 1, 2 and 3 are caused to intiate operations which will result in their being parked (see the extreme left column under the heading "Special Service Program") at the assigned floors with their doors closed at 11:40 by virtue of the closing of clock number 2 contacts 1 and 6. These contacts energize program relay 65 and required car load relay 3N. At 11:40 the doors of the parked cars are opened (see the column second from the left under the heading "Special Service Program") by operation of contacts 4 and 6 of clock number 2 which energize special service door open relay PP. The subprogram is terminated (see the third column from the left under the heading "Special Service Program") at 11:43 by operation of contacts 5 and 6 of clock number 2 to insure the return of all cars to the normal noon program.

The invention as exemplified herein is applied to a building having a basement, a ground floor at which essentially all passengers enter and leave the building and eight floors above the ground floor numbered one to eight. The building offers office space primarily and is occupied by a single tenant. Thus, the demand for service at noon can be established by the tenant by dictating the lunch period for various groups of employees. This has been accomplished by staggering the lunch periods for groups of employees assigned to the various floors. Since essentially all occupants begin and end their work day at the same instant, heavy peaks of traffic are experienced immediately preceding the beginning of the work interval and at the end of that interval with an extremely sharp peak being experienced almost at the instant the interval terminates.

Elevator service is provided for the building of the example by a four car bank of elevators equipped for push button control with attendant or automatic operation and includes automatic dispatching means. The basic equipment for providing this service is conventional and therefore has not been shown. The system offers five major operating programs which can be selected manually, as shown in FIG. I, as by means of a switch 201 in the starter's control panel or automatically by time clock control coupled to the master clock of the building, as represented in FIG. II; whereby, as will be better appreciated from the detailed description below, the various functions are synchronized with the traffic pattern of the building. Synchronization is achieved since the timer for the building in essence constitutes means dictating or at least strongly influencing the demands for service by indicating the working periods for individuals and groups within the building. Accordingly, the group of cars can be set up to follow a first pattern or program of operation which is chosen to best fulfill the general needs of the building and a second pattern or program can be superimposed thereon, advantageously just prior to peaks in service needs at particular locations, to meet those needs. The use of a master timer to indicate to the anticipated passengers the initiation of their free periods or the termination of the working day and to establish the primary and secondary programs, insures the proper relationship is maintained between the general service and the recurrent predictable increased service needs. Reference to a master timer or clock and to timing means influencing the demand for service is not to be interpreted as restricted to a timer for an entire building, it being appreciated that the elevator system might be synchronized with a timer for only a portion of a building such as one or more floors.

When switch 201 of FIG. I is engaging contact 203 the up peak program is in effect and the system offers instant dispatch from the lower terminal, the ground floor, high call operation, and certain cars are assigned to serve particular floors. In addition, a car is reserved for assignment by the starter or the attendant to relieve any overflow from the cars with fixed assignments. Service is facilitated during this program by eliminating basement service or service in response to hall calls since the particular application contemplates that this program will be placed in effect primarily in the morning when passengers are arriving at the building and seeking service to their work locations.

Positioning contact arm 201 to engage contact 204 causes the system to operate with an off peak prorgam wherein dispatching is timed from the upper and lower terminals and balanced by decreasing the dispatch interval when cars accumulate at a terminal and by correspondingly increasing the interval at the opposite terminal. This program also offers traffic flow compensation whereby an increase in the number of down hall calls above predetermined level shifts dispatching at the lower terminal from timed to immediate and an increase in car calls above a given value cause a similar shift in the upper terminal dispatching.

A noon program is provided by engaging contact arm 201 with contact 207 to operate the system with timed dispatching from the upper terminal and with round trip operation to the bottom terminal.

Instant dispatch from the bottom terminal and high call return operation of the cars are employed under the down peak program offered by positioning contact arm 201 to engage contact 205.

Intermittent service such as is warranted nights, holidays and week ends is realized when contact arm 201 engages contact 206. Under this program the system operates with timed dispatching from the lower terminal, on call dispatching and high call operation. When demand falls below the level warranting a car remaining in service, the motor generator for that car is shut down automatically.

The above enumerated features of the up peak, off peak, noon, down peak and intermittent programs have not been discussed in detail nor shown in the drawings since they do not constitute material elements of the present invention and since most of those modes of operation and their means of attainment are well known to those skilled in the art or readily realized by known means. The present invention is concerned with techniques of bringing these features into operation and integrating their operation with the features described below and with the anticipated traffic within the building to provide the best service for a given expenditure of car capacity. These objectives are realized by positioning contact arm 201 on contact 202 as shown to place the system on automatic time controlled operation. Automatic program relay H6 is energized to close contacts at line 3 of FIG. I and line 41 of FIG. IV and to enable the automatic time controlled selection of the remaining prorgams and the special service operating means.

The timing means represented in FIG. II may be a pair of commercially available program clocks 1C and 2C each having six contacts which can be closed at desired instants. Power is supplied to the clocks by transformer 211 through switch 212 and individual clock motor contacts 213 and 214. The clocks 1C and 2C are driven by electrical impulses derived from the power circuit by closing contacts 213 and 214 periodically, e.g. once a minute. Driving impulses can be supplied by the building master clock through leads 215 whereby the elevator service is synchronized with the master clock. Thus, the timed controls can be set to function to anticipate elevator service demand as by selecting and assigning cars to preferentially serve a given floor, whereby one or more cars are present and available for service at the instant the anticipated passengers are permitted to leave. Accordingly, the system is utilized efficiently under a general service program up to the instant immediately preceding a special demand and yet is intensively utilized at a particular location in satisfying that demand in the shortest time possible.

Inasmuch as the nature of the contacts of clocks 1C and 2C of the type employed are such that they may chatter during the stepping of the clock mechanism, and contact chatter may detrimentally affect the circuits associated with clock 2C, means are provided to open the circuit to clock contacts 2C–1 through 2C–6, representing contact one through six of clock 2C, when the clock is stepping. Relay DUC of FIG. II is of the slow dropout type. It is normally deenergized so that its back contact at line 56 of FIG. IV is closed to maintain slow dropout relay DUCA energized. While DUCA is energized its back contact DUCA at line 21 of FIG. III is held open. Relays DUC and DUCA have overlapping time intervals whereby the circuit for the 2C clock contacts in FIG. III is momentarily energized while the clock is quiescent once each interval. This is achieved by employing a slower dropout for DUC than for DUCA so that an impulse tending to step the clocks picks up DUC immediately to deenergize DUCA. The stepping impulse is momentary; however, DUC remains picked up beyond the instant DUCA releases. Hence, the circuits of the 2C clock contacts are closed at line 21 while DUC is picked up and DUCA is dropped out and are reopened when DUC is dropped out to pick up DUCA. As a result the 2C contacts are active only after the stepping of clock 2C has been completed.

Referring now to FIG. V, consider the operation of the system while set on automatic as the day progresses beginning prior to 7:45. During the preceding night, the system has been operating on its intermittent program with program selection relays PS4 and PS4A sealed in at line 34 of FIG. III to maintain that program with contacts PS4A at lines 7 and 11. Auxiliary program relay PS4B is energized and sealed in at line 10 to provide a parallel path for the intermittent program controls at line 8 and disable the other program controls at line 3.

When the clock 1C reaches 7:45 in the morning, its number 1 contact 1C–1 closes at line 27 of FIG. III to energize relays PS1 and PS1A. These relays are sealed in by PS1 contact at line 28 from lead 216 to lead 217, through lead 218, contacts PS5, PS4, PS3, PS2, and PS1. The PS4 and PS4A relays are deenergized at line 34 by the opening of back contact PS1 in lead 219. The intermittent program is maintained, however, by relay PS4B of FIG. I which remains energized until the release of PS4A is coincident with the opening of contact 3C at line 10. Contact 3C is operated by three car relay (not shown). This relay is arranged to pull in as a third car enters service as by a group of parallel resistance paths to its operating coil, each path being introduced upon the entry into service of its corresponding car.

Thus, the system remains on intermittent operation until sufficient demand is registered to require three cars in service, at which time the resistance to the coil of the 3C relay is reduced to a level permitting its current to attain the value necessary to pull it in. When this occurs, back contact 3C at line 10 opens, PS4B drops out, the circuit to the intermittent program control is broken at line 8. At that instant the circuit available to the remaining timer controlled program controls is energized at line 3. Since conact PS1A to the up peak program control is closed at line 3, the up peak program is introduced at this time. Thus, the system is provided with service measuring means which shifts it from a first operating program, e.g. the intermittent program, to a second operating program when a predetermined level of service demand exists during a certain period of its timed operating cycle. As discussed, this level is an increase above a certain minimum of service, however, it might as readily be a reduction below a certain level where it was deemed desirable to use a timer controlled program for limited car service.

In the event that the service demand did not attain the level requiring the service of three cars and the 3C contact at line 10 failed to release PS4B, the system might remain on the intermittent program throughout the day. However, when the threshold of service is reached and the normal cycle is introduced, operation is in accordance with the pattern for that time of day. Thus, if the threshold is first reached in mid morning, say 10:30, the off peak program is introduced and the timed program is completed in accordance with the remainder of the timed schedule even if demand subsides to the point where less than three cars are in service. Accordingly, the operating pattern is synchronized with the time of day as indicated by the master timer at any time it is introduced.

Incidental to the operation of the program selection relays, signals are operated at a master station to indicate which operating program is in effect and in some instances which secondary program is dictating the operating pattern of the system. For example, relay PS1A can include a contact (not shown) to a circuit controlling an indicator lamp in the starters panel to illuminate an up peak program indicator while that program is effective.

The work day for the preponderance of the occupants of the building is scheduled to begin at eight in the example. Therefore, the automatic control is arranged to shift to the off peak program at eight on the assumption that the bulk of the inflowing traffic will have passed at this time and the service needs will best be served by a more balanced program. This shift is effected by clock 1C closing its second contact 1C–2 at line 29 to energize program selection relays PS2 and PS2A, from lead 216 through leads 234 and 263 to lead 217. These relays are sealed in at line 30 from lead 216 through leads 218 and 264, contacts PS1 and PS2, and lead 217. They disable all other program selection relays by opening PS2 back contacts at lines 28 and 32 and a PS2A back contact at line 34. Contact PS2A at line 4 of FIG. I introduces the off peak program. As was the case with the above discussed and remaining program selection relays, relays PS2 and PS2A can also serve the incidental functions of operating program selection and time interval indicators which, for example, might be located in the starters panel (not shown). In addition, the PS2 relay can alter the dispatch interval as by increasing or decreasing the voltage applied to the motor of a dispatch timer as shown in FIG. XII.

A time controlled dispatch timer is shown in FIG. XII wherein a D.C. dispatch timer, motor armature 220 is supplied with a controlled voltage from a rectifier bridge 221 to alter its speed and thereby the interval between dispatch signals. Voltage to the motor is derived from an A.C. source through an auto transformer 222 having taps 223, 224, 225, and 226 each connected to contacts 228, 229, 230, and 231 respectively of a selector switch having a contact arm 232. The selector switch can be set manually to vary the voltage to transformer 233 supplying bridge 221 or the voltage can be selected by clock controlled relay contacts PS2, PS4, and PS5 when the contact arm 232 engages contact 227. Thus, the dispatch signals may be issued by contacts (not shown) actuated by the dispatch motor armature 220, which are closed cyclically as the armature revolves, to define a given dispatching interval. At the end of each interval a dispatch activates a car to travel in a given direction, as from an upper or lower dispatching terminal, or from a highest call as in late car reversal operation. The timer controlled contacts PS2, PS4, and PS5 constitute means responsive to the program timer altering the dispatching interval to best suit the program established by the timing means of the elevator system. Independent variable dispatching intervals can be achieved by using two dispatching timers, one for dispatching cars upward and one for dispatching them downward.

The system as described thus far has involved shifting between fixed or primary programs which serve the building generally in accordance with the time of day and service demand and has utilized but one clock. Subprograms or secondary programs within major programs are employed during the noon program and evening down peak programs when the controls are automatic to offer preferential service by preselected cars to certain floors. Thus, the general noon program is introduced at 11:00 a.m. by the closing of contact 1C–5 at line 35 which energizes relays PS5 and PS5A through leads 234 and 263. Those relays are sealed in at line 36 of FIG. III through lead 219 by contact PS5. All other program selection relays are deenergized by opening back contacts PS5 at lines 28 and 34. The noon program controller is actuated at line 9 by contact PS5A. As noted above, this program generally involves timed dispatching from the upper terminal and round trip operation of the car to the bottom terminal at the ground floor. This general operational pattern is followed until 1:30 p.m. when, as shown in FIG. V, the off peak program is put back into effect.

During the general noon program, contacts in clock 2C are operated to modify the program during certain periods.

The working schedule for certain of the building occupants located on floors 3 and 8 is such that their lunch period begins at 11:15. In order to facilitate their travel to the dining facilities, cars 1, 2, and 3 are made available to floors 3 and 8 for special service downward at that time by parking the cars at the assigned floors just prior to that time with their doors closed and by opening those doors at the instant the lunch period begins. With the noon program in effect, this is accomplished, as indexed on FIG. V, by the operation of clock contacts 2C-2 and 2C-6 at lines 22 and 26 respectively on FIG. III to momentarily energize relays P2 and P6 over an interval dictated by the closure of contact DUCA as described above. Relays 22 and 4N of FIG. IV are thereby energized through a path from conductor E2 through P2 at line 46, P6 at line 49, coil 22 at line 49, coil 4N at line 44, contacts P5, DP, NA, and 2N at line 42 and the time controlled program contact H6 at line 41 to conductor E1. When relay 22 is energized, it seals itself and relay 4N in at contact 22 on line 48 and sets up stopping circuits on the lanes for the appropriate cars of special service stopping contacts of the floor selector machine as shown in FIG. VI. These contacts are identified by a three digit number wherein the units digit signifies the car number and the hundreds digit signifies the floor for all but the second floor wherein the contacts for cars 1, 2, and 3 are 235, 236, and 237 respectively. Thus, relay 22 by its front contact at line 61 activates contacts 801 and 803 to stop cars 1 and 3 for special service at the eighth floor while back contact 22 at line 61 maintains contact 802 deactivated. Front and back contacts 22 at line 72 activate contact 302 to stop car 2 for special service at the third floor.

Relay 4N closes contacts at lines 83, 87, and 90 to prepare the circuits in FIG. VII to the relays CN1A, CN2A, and CN3A of cars 1, 2, and 3 respectively. These relays operate to return the cars to their general program of the moment when the assigned number of special service trips have been completed.

Energizing of relay 4N also closes a contact at line 54 to energize the required car load relay NA at line 55. Required car load relay NA reduces the available paths for the floor trip and car load relays to those including contacts of the trips completed relays for cars 1, 2, and 3, namely CN1A, CN2A, and CN3A by opening contact NA at line 42. An additional function of NA is to complete a portion of the path between E1 and E2 in FIG. VI for the special service stopping relays HCNA and HCN and to energize the special service relays SSR for each of cars 1, 2, and 3 by closing contacts NA at lines 62 and 70.

Conventional hall call registering and reset means are illustrated for the seventh floor in FIG. IX. These include hall call buttons BU7 for up travel from the seventh floor and BD7 for down travel from the seventh floor. A passenger desiring to travel upward from the seventh floor depresses BU7 to energize hall call registering relay S7U and latch it in its call registering condition so that its contact S7U is closed to activate the seventh floor up contact 7U of the floor selector. An up traveling car normally would stop at the seventh floor when the brush 238 engages contact 7U. A stopping circuit is completed to energize stopping relay S by this call when the car is set for upward travel, its up field relay UF (not shown) is energized to close contact UF at line 113, and its brake relay BK (not shown) energized to close contact BK at line 113. Relay S is connected to leads E1 and E2 through S7U, 7U, 238, lead 239, UF, S, BK, and SSR. Similarly, a down hall call is registered by depressing a down button to energize a down hall call relay and close a contact in a lead to a floor contact in the lane of down travel stopping contacts, 7D through 1D, of the floor selector.

Reset of the hall call is accomplished in the usual manner by reset coils (shown above the operation coils) on the hall call relays. A reset coil is energized from contacts in the hall call reset lane of the floor selector. The up call at the seventh floor is reset when brush 240 engages contact 241 of the up reset lane to complete a circuit from E2 through reset coil S7U, contact 241, brush 240, lead 242, up load relay contact UL, and special service relay contact SSR to E1. The down reset circuit is similarly operated by engaging a contact in the down stopping lane with brush 243 while down load relay (not shown) is energized to close contact DL.

Operation of the SSR relays in FIG. VI for cars 1, 2, and 3 opens a contact in the circuit to brush 238 and corresponding down hall call stopping brush 244 at line 119 of FIG. IX for the floor selector of each car to disable its hall signal stopping relay S. Thus, each assigned car is prevented from responding to up and down hall signals while assigned to special service when the crosshead of its floor selector carries those brushes across energized hall signal contacts 1U through 7U and 1D through 7D. The floor selector circuits are further modified to prevent the car on normal operation from responding to down hall calls at special device floors by including in the down hall signal circuits between lead 245 and the respective down hall signal contacts 1D through 7D, contacts which are opened by the floor trip relays of FIG. IV. Thus, cars generally serving the building, as car 4 does during the noon program, will not respond to third floor hall calls during the cycle under discussion since relay 22 holds contact 22 at line 117 open so that the closing of down hall call contact S3D for the third floor cannot complete the stopping circuit for the cars remaining on general service, even though those cars having their SSR contacts closed.

Relay SSR and particularly contact SSR at line 119, thus constitute means rendering a car nonresponsive to hall calls while assigned to a special service program. Further, that SSR contact in combination with the floor trip relays of FIG. IV and particularly their contacts at lines 112 through 118 of FIG. IX down hall call stopping circuits constitute means preventing all cars of the group but cars assigned to the given floor from responding to hall calls at the given floors, these contacts constitute means reducing the service to a given floor by cars of the group other than a car assigned thereto during the period of assignment.

It is desirable to maintain the hall calls in registration as the special service cars pass the landing in order that they remain effective to stop the cars on general service. Means maintaining the hall calls is shown at line 120 of FIG. IX. This means comprises the parallel circuit to brushes 240 and 243 of the reset contact lanes including back contact SSR of special service relay and front contact HCNA of peak service stopping relay at lines 120 and 121. While the car is assigned to special service, contact SSR is open thereby breaking the circuits to the brushes 240 and 243 of the up and down reset lanes. However, the contact HCNA closes while a car is at its assigned floor thereby resetting the hall calls at that floor since that floor is given the service sought by any passenger registering a call.

It is desirable to avoid use of a car assigned to provide special service by prospective passengers awaiting service at other than the special service floor. Such use is possible when the car stops at a floor in satisfying the demands of its passengers. One means of discouraging the entrance of passengers at these floors is to disable the conventional car travel indicating means while the car is assigned to a special service function. Ordinarily a travel indicator such as an "up hall lantern" 310 and a "down hall lantern" 311 are provided for each car at each landing served by that car. These lanterns are arranged to be lighted at the landing at which a car is stopped or is to be stopped in a short time to indicate the direction of travel of the car away from the floor and alert the prospective passengers to its presence. A conventional circuit is shown in FIG. X for performing these functions. It comprises a lane of contacts for the up signals arranged to be engaged by a brush 312 on the crosshead of the floor selector which is activated when the car is to stop at that landing (as indicated by conventional circuits not shown) and is set for up travel by the closure of contact UL of the up direction determining relay. Similarly, the down lantern 311 is lit when the car approaches a floor at which it is to stop as a result of the engagement of brush 313 with the contact 314 for that floor in the down lane of contacts while contact DL of the down direction determining relay is closed. When the car is assigned for special service, back contact SSR in series with both contacts UL and DL is opened, thereby deactivating both brushes 312 and 313 and preventing lighting of the hall lanterns. Thus, when an assigned car stops at a landing to discharge a passenger, a prospective passenger at the landing receives no forewarning that a car is to arrive and no indication of the direction the car will depart from the floor and, accordingly, will be inclined to disregard that car. The presence of the assigned special service car, its availability for service, and the direction in which it will depart from the floor are indicated at the assigned floor by operation of the appropriate hall lantern by the closure of contact HCNA to complete a path around open contact SSR when the special service stopping relay is actuated. As described below, relay HCNA is energized only while an assigned special service car is at the floor for which it provides special service.

Travel indicators other than hall lanterns can similarly be altered in their operation while a car is providing special service. For example, car position indicators at the various floors can be disabled by appropriate SSR contacts or the disabling can be selective so that indicators at the dispatching station for the elevator bank are always operative and the indicator at the assigned floor functions during the assignment. As in the case of the hall lanterns, the position indicators would return to their fully functioning condition when the assigned car fulfills its assignment or is otherwise returned to general service.

During this first interval of the first special service cycle, from 11:14 to 11:15, the car button circuits remain activated and the car satisfies all demands placed upon it by that means. Interruption of the assigned car's response to car calls when passing its assigned floor before all car calls have been canceled is prevented by contact CBT of the car signal direction relay (not shown). This contact for each car is in series with the special service stopping relays HCN and HCNA of that car. It is maintained open until the car calls have been canceled and the car has stopped at a landing. When the car calls have been canceled, the car is caused to travel to the assigned floor either by virtue of being set to travel in that direction in responding to the last car call, by being set for travel in that direction when the last car call is satisfied by a conventional furthest call reversal circuit (not shown), or by traveling to a terminal after the last car call stop and being reversed at that terminal in the conventional manner (not shown). Movement of the car to the special service floor is sensed in the lanes of special service stopping contacts of the floor selector machine shown in FIG. VI. In the present example, car 1 will have brush 246 engage activated contact 801 of the appropriate contact lane of its floor selector to energize its special service stopping relays HNC(1) and HCNA(1), through a path at line 62 from E1, contacts NA and CN1A the parallel relay coils, contact CBT(1), brush 246, contacts 801 and 22 to conductor E2. Similarly cars 2 and 3 will cause their brushes 247 and 248 to engage activated contacts 302 and 803 of the third and eighth floor and operate special service stopping relays HCN(2), HCNA(2), HCN(3) and HCNA(3).

Pertinent fragments of a conventional elevator car stopping circuit are shown in FIG. XIII to illustrate the special service functions modifying such circuits to stop and to hold a car parked at an assigned floor. When the crosshead of the floor selector for an assigned car engages the special service contact for the assigned floor to energize relays HCN and HCNA as disclosed in FIG. VI, contact HCN at line 133 of FIG. XIII is closed to activate brush 255 engaging the floor selector lane of stopping contacts. Only a portion of those contacts extending from the basement contact SB through the fourth floor contact S4 are shown. This simulates a call for service at that floor by activating an appropriate contact in a series on a commutating device coupled to the advancer drive for the crosshead of the floor selector. A pair of contact segments 256 and 257, which may be segments of a vernier disc of the type employed in the elevator stopping circuits and apparatus illustrated in Patent 2,062,432 which issued Dec. 1, 1936, to E. B. Thurston et al., are mechanically moved along vernier contacts V1 through V7. As with the stopping contacts, only a portion of this contact group is shown, the group being expanded in practice in accordance with the number of stopping contacts on the floor selector and thus the number of floors served. Segments 256 and 257 may be driven by the means driving the crosshead although they are driven at a greater speed whereby sensing of the control positions is more exact than with the crosshead alone. When these segments arrive at the exact position for stopping the elevator they deenergize the advance motor stopping relay to stop the motion and that of the crosshead such that the deceleration of the elevator car is initiated and the car brought to a stop at the corresponding floor. These stopping circuits are conventional as evidenced by the aforenoted patent. They are only partially represented for illustration of this invention by relay V at line 31 which is energized momentarily as segment 256 or 257 engages a contact activated by brush 255. Thus the relay is energized just prior to the instant the control elements reach their stopping position and is deenergized as they reach that position by causing the segments to straddle that contact without engaging it.

Assume a car is traveling upward so that up field relay contact UF at line 131 is closed to connect brush 257 to advance motor stopping relay V. As the crosshead of the floor selector arrives at the floor to be given special service and closes contact HCN at line 133, the repetitive scanning of the vernier contacts V1 through V7 by the disc (not shown) bearing the contact segments 256 and 257 brings contact segment 257 into engagement with the live contact for that floor. Advance motor stopping relay V is thereby energized from lead 258 through lead 259, coil V, contact UF, contact segment 257 the appropriate vernier contact of the V series, the cross connection to the stopping contact of the S series, brush 255, lead 260, contact HCN to lead 261. The contact segments and crosshead are thus stopped so that in their final position they straddle the vernier contact, in the manner illustrated for V5 in FIG. XIII, so that the live contact is no longer engaged and relay V drops out.

When relay V is energized, contact V at line 139 closes to energize a second advance motor stopping relay VR. VR seals itself in at line 140 through lead 262 and is held in when the contact segment 257 moves beyond the active vernier contact until the car is stopped at the floor and brake relay BK drops out to open contact BK in lead 262. Back contact of relay VR at line 141 is opened while the relay is energized to deenergize the car starting circuits, car switch relay CS and door closing relay CLI representing a portion of these circuits. Stopping of the car drops out relay VR permitting contact VR at line 141 to close, however, the starting circuits are prevented from issuing a car starting signal by the parallel combination of open contacts CL1 and TR in series with relay CS.

Operation of the special service stopping relay HCN energized starting time relay TR at line 145 by closing contact HCN. Back contact TR at line 142 is thus held open to maintain the car starting circuits dormant after they are opened by contact VR until relay HCN is dropped out. Relay HCN is held in until a car call is registered to energize car signal direction relay CBT as may be seen from FIG. VI.

As shown in FIG. XI, the arrival of the crosshead at the assigned floor prepares the direction controlling circuits to set the car for downward travel when the car comes to a halt at that floor. As is well known, circuits of this nature are arranged to be reset only while the car is stationary; accordingly, when the car stops, the down direction of travel control becomes effective and when the car is restarted it will leave the floor traveling in a downward direction. This is accomplished by an HCN back contact in series with the direction control activating circuits which is opened as the crosshead reaches the row of contacts for the assigned floor, and by an HCN front contact in series with the down direction of travel control to activate that circuit at that time, whereby it operates to set the car for down travel when it stops.

Means maintaining the doors of an assigned car closed when it stops at its assigned floor are also shown in FIG. XI. These comprise the parallel combination of normally open contact PP and back contact HCNA. Since HCNA is energized when the crosshead picks up the assigned floor, it opens the only path then available to the door opening circuits and the doors cannot be opened. As pointed out above, relay HCN and HCNA remain energized until a car call is registered, and since no passenger can enter the car until its doors are opened the car is blocked from further operation. Thus, the car remains parked at the floor with its doors closed and set for travel in a given direction, downward, until it is released by permitting the doors to open and reclose.

Referring again to FIG. V, at 11:15 a.m. number 2 clock contacts 2C–4 and 2C–6 close to operate relays P4 and P6 of FIG. III. Contact P4 at line 38 closes, energizing relay P4A which closes its contact at line 52. Relay P6 closes its contact at line 53 to complete a circuit from E2 through P4A at line 52, P6 at line 53, peak service door open relay coil PP, conductor 250, contact P5 at line 42, parallel contact DP, CN1A, CN2A, CN3A, and CN4A, parallel contacts CN1A, CN2A, and CN3A, parallel contacts 2N, CN1A, CN2A, and contact H6 to E1.

Relay PP seals itself in at line 53, energizes the door opening circuit by by-passing the open HCNA contact in FIG. XI and closes a contact at line 101 of FIG. VIII to activate the car trip counting circuits. Passengers enter the car almost immediately and register car calls which cause relay CBT for that car to become energized. Contact CBT in series with relays HCNA and HCN therefore opens and permits those special service relays to drop out thereby permitting the direction control circuits and car starting circuits to be reactivated. Contact HCN at line 145 of FIG. XIII opens to deenergize slow drop-out starting time relay TR. Contact TR at line 142 closes energizing relay CS and CL1 which, in turn, close the car doors and issue a start signal. It may be noted that the release of HCNA and HCN can be accomplished by means other than car calls, for example, they may be dropped out upon the expiration of a suitable time interval, by the entry of a passenger as sensed by a photocell in the car entry, or by a load sensing device operated when a desired load level is reached.

Car trips are counted by relay CN which may be a stepping relay having resetting means which is conditioned to be energized by closing a contact in the reset coil circuit when the first stepping pulse is registered and thereafter is operative in response to a single energizing pulse in that circuit. One such form of relay is the well known rotary stepping relay having ten steps and a ratchet release which can be actuated by energizing a reset coil. The illustrative embodiment of FIG. VIII employs relays of this type wherein the stepping coil is represented above the corresponding reset coil and each pair of coils is identified as to its car by a number suffix, e.g. car #1 counting relay is CN1.

A single trip count is completed as a car leaves the special service floor as will be appreciated from a consideration of the contact series between conductors DC1 and DC2 at line 101 of FIG. VIII. Thus, contact PP is closed by the timer, contact AA(1) of an acceleration relay of the car lifting motor controller closes as car #1 stops at the floor as does contact HCNA(1) to energize stepping coil CN1 through resistance 254 and advance the relay by one count. The initiation of movement of the car and the departure of car #1 from the special service floor opens contact AA(1) and HCNA(1) and prepares the relay for the reception of another count.

The cycle under consideration requires a single trip of cars #2 and #3 and two trips of car #1. Cars #2 and #3 step relays CN2 and CN3 one step as contact PP closes to close contact CN2–1 and CN3–1 at lines 86 and 90 respectively of FIG. VII. Trips completed relay CN2A is energized in this manner through the path from E2 to E1 including closed contact 4N at line 87, contact CN2–1, coil CN2A, contact BS3(2) of basement service relay BS3(2) (not shown) and up direction determining relay UL1(2) (not shown). Relay BS3 is energized while the car is above the first floor so that the count of the CN relays is effective on the trips completed relays only just prior to the arrival of the car at the first landing, while traveling downward. Relay CN3A is similarly energized while the closing of the first contact CN1–1 of the counting relay of car #1 is ineffective. CN1A is energized by a circuit through contact 4N at line 83 upon the arrival of the car at the first landing following the second count of relay CN1.

When car #1 completes its first downward trip from the eighth floor, its direction of travel is reset by the usual reversal circuits at the lower terminal or basement and it is returned to the eighth floor for its second assigned trip. During this upward travel the car remains nonresponsive to hall calls and those other special service modifications in operation are maintained since the car trip relays of FIG. IV remained energized through the CN1A contacts of line 43.

Operation of the several trips completed relays releases the respective cars to the normal operating state of the noon program. Thus, relay CN1A when energized seals itself in at line 81, and opens the special service circuits of car #1 at line 62 to deenergize special service stopping relays HCNA(1) and HCN(1) and to deenergize special service relay SSR(1). When all of the special service cars have operated their trips completed relays, the car trip circuits of FIG. IV are released since those back contacts in parallel with contact NA at line 42 are all opened by operation of relays CN1A, CN2A, and CN3A.

As shown in FIG. V, at 11:18, clock #2 contacts 2C5 and 2C6 are closed to terminate the first special service cycle if the service has not been terminated by operation of all of the trips completed relays. These contacts operate relays P5 and P6 of FIG. III at lines 25 and 26 respectively to open parallel contacts P5 and P6 in lines 42 and 43 of FIG. IV thereby dropping out the floor-trip relays, the required car load relays and the peak service door open relay. Series contacts P5 and P6 between DC2 and lead 251 also close at this time to energize the reset coils of all trip counting relays in FIG. VIII and reset those counters. It is to be appreciated that under normal circumstances these relays would have been released by the completion of the special service and that this time limit feature is primarily to avoid disrupting service in the event some unforseen contingency arises as where a car is prevented from leaving the floor for a substantial interval due to operation of a safety device. The combination of P5 and P6 relays constitutes means establishing a limit to the interval the cars can be assigned to special service which cooperates with the counting relays to constitute means releasing the cars from their assigned condition upon the completion of a given number of trips or the expiration of a given time interval, whichever occurs first. Upon release of the cars to the general program control they are permitted to initiate their trips in the given, downward, direction from other than the assigned floor and otherwise may be controlled by means conventional in the elevator control art.

A circuit is included in parallel with the count circuits of each of the trips completed relays CN1A, CN2A, CN3A, and CN4A of FIG. VII to insure against failure of those relays in the event a count exceeding that assigned is registered by the counting relays. These circuits comprise a contact of the count relay for the respective trips completed relay which is closed for all counts exceeding the maximum number of trips assigned to the car. Thus, car #1 makes a maximum of four trips under a subprogram, hence, a count of 5 or more on relay CN1 closes a contact CN1–5, 6, 7, 8, 9, 10 in lead 252 at line 81 of FIG. VII to energize CN1A thereby returning the car to the general service program.

The remainder of the noon program includes special service cycles all operating in a similar manner and utilizing circuits of the type outlined above to selectively assign one or more cars to the group including cars #1, #2, and #3 to particular floors at particular instants just preceding anticipated special demands for service. Throughout the noon program car #4 remains on the general service program except that it is prevented from serving a hall call at a floor while that floor is receiving special service. Similarly as their requirements are fulfilled the special service cars revert to the same mode of operation as car #4. In view of the similarity of the succeeding noon special service cycles to that described above, further description of those cycles is believed unwarranted. One skilled in the art may readily trace their operation by reference to the chart of FIG. V if further examples are desired.

The outgoing rush of traffic at the end of the working day is met in the sample installation by arranging the timing mechanism to condition the elevator supervisory equipment whereby the heavy demand for elevator will be met by utilizing all four cars of the bank and assigning each car to one of the higher floors of the building. This type of service is best given by having the cars available at the instant the work period ends. This need is met by parking the cars at the assigned floors shortly prior to that instant as described above. Premature use of the cars is avoided by parking with the doors closed as described. The number of trips for each floor is dictated by the service demands ranging from three trips by car #3 to the sixth floor to six trips by car #4 to the seventh floor.

As may be seen in FIG. V preparation for a 4:45 demand for service is instituted at 4:44 by operation of contact 1C3 of clock #1 and contact 2C4 of clock #2. The down peak program is introduced by energizing relays PS3 and PS3A at lines 31 and 32 of FIG. III to alter the dispatch timer speed, operate program selection and time interval indicators, energize the down peak program control at line 6 of FIG. I, seal in PS3 and PS3A at line 32, deenergize the circuits to the remainder of the program selector relays, and close a contact at line 54 which is in lead 253 of FIG. IV connected to the down peak relay DP. Down peak relay DP is energized through a path from E2 of FIG. IV through P4A at line 52, coil DP at line 54, contact PS3A at line 54, lead 253 the parallel CN1A, CN2A, CN3A, and CN4A contacts across contact DP at line 42 the parallel groups of contacts including NA and 2N, and contact 6H to lead E1. As above, these circuits, particularly those controlled by relay DP, prevent the cars from responding to hall calls, serve the remaining car calls without operating the car position indicators in the halls, then proceed to their assigned floors to await the initiation of special service by the timer controlled operation of peak service door open relay PP at 4:45.

Operation of DP is sealed in at line 54, it also operates the special service relays SSR for cars 1 through 4 at lines 63, 71 and 74 of FIG. VI and enables the corresponding peak service stopping relays HCN and HCNA for those cars to be energized when the brushes 246, 247, 248, and 249 engage the appropriate special service stopping contacts on the floor selector. The appropriate contacts of the trip counting relays in the trips completed relays CN1A, CN2A, and CN3A are prepared for operation by closing DP contacts at lines 85, 89, and 92 of FIG. VII respectively. The remainder of the contacts opened and closed by operation of DP set up the appropriate stopping circuits in the floor selector. Thus, the opening of DP at 61 and closing at 62 establishes a stopping circuit for car #2 when it reaches the eight floor. Similarly, car #3 stops at the sixth floor when DP at 66 closed while opening of DP at 68 and closing DP at 69 stops #1 at the fifth floor. Seventh floor contact 704 for car #4 is tied directly to E2 to stop that car while DP is closed at line 74.

Assuming the cars have been able to discharge all passengers and park with closed doors and set for downward travel at their assigned floors by 4:45, at that instant the operation of PP opens all of their doors and initiates the special service. This service is achieved in the same manner as described above. As each car serves its final assigned trip it is released at the bottom terminal and thereafter until introduction of the intermittent program at 5:00 p.m. it operates with the conventional down peak operation including instant dispatching from the bottom terminal and high call return operation.

The system has been described above as combined with a particular elevator supervisory equipment of known type and has been exemplified with a particular operating cycle. However, it is to be understood that these examples were not intended to be read as limiting the spirit or scope of the invention. It is recognized that the control elements described in detail and their modes and sequence of operation can be modified in ways well known and obvious to those skilled in the art. Accordingly, it is to be understood that the applicant considers those equivalents within the scope of his invention.

One modification which is considered to be within the scope of this invention involves setting up programs of the type described either in response to a certain demand or manually. Thus, it is sometimes desirable to assign a car to a floor offering a particularly heavy demand and exclude other cars from serving that floor thereby preventing the passengers from that floor from dominating the entire bank of cars. Such service might be instituted upon registration of a given number of hall calls or a given time that those calls remain in registration. One skilled in the art will appreciate the modifications required to substitute for or superimpose on the present timer mechanism manual and demand controls setting up special service cycles offering the features spelled out above. Thus, the above description is to be read as illustrating the invention and not as limiting its scope to the described system.

Having described the invention, we claim:

1. In an elevator system serving a plurality of floors, means assigning a car to park at a given floor, hall call registering means, means rendering said car nonresponsive to all hall calls while assigned, car call registering means, means controlling operation of said car while assigned in response to a car call, car travel indicators at a plurality of floors, means for operating the indicator at said given floor in response to said car, means for rendering said car travel indicators nonresponsive to said assigned car at other of said plurality of floors, means requiring said car to initiate its travel in a given direction from the given floor while assigned, means counting the trips of the car from the given floor while assigned, means timing the interval said car is assigned, and means releasing said car from the assigned condition upon the completion of a given number of trips or the expiration of a given time interval, whichever occurs first.

2. In an elevator system including a group of cars each serving a plurality of floors, individual means for each of a plurality of said cars to assign respective cars to serve given floors, hall call registering means, selection means for selecting cars for assignment by said individual means, means rendering assigned cars nonresponsive to all hall calls, car call registering means for each car, means responsive to car calls for controlling the operation of said cars, car travel indicators at a plurality of floors, means for operating the indicator at the given floor while a car is assigned to serve that floor in response to that car, means for rendering said indicators at other of said plurality of floors nonresponsive to assigned cars, means requiring each car to initiate its travel in a given direction from its given floor while assigned, means timing the interval the cars are assigned, means for counting the trips of assigned cars from their given floor, and means releasing said cars from their assigning means upon the completion of a given number of trips or the expiration of a given time interval, whichever occurs first.

3. In an elevator system means initiating travel of a car in a given direction from a floor assigned to that car, means to count the number of trips by the car from the assigned floor, means measuring an interval of time which the car is available for service to the assigned floor, and means permitting the assigned car to initiate its travel in the given direction from other than said assigned floor upon the completion of a predetermined number of trips registered by said counting means or the expiration of a given interval as determined by said interval measuring means, whichever occurs first.

4. In an elevator system, a car, a plurality of floors including a terminal floor served by said car, means initiating the travel of said car in a given direction from a given floor other than said terminal floor, means to count the number of trips by said car in the given direction from the given floor, means permitting said car to initiate its trips in the given direction from a floor other than said given floor when the number of trips registered by said counting means attains a predetermined level, and means resetting said counting means upon the expiration of a predetermined interval.

5. In an elevator control system means counting the number of trips made to a given floor, second means actuated by said first means indicating a given count to alter the operating pattern for said control system, and means actuated by the registration of a count greater than said given count to actuate said second means.

6. In an elevator control system means initiating the travel of an assigned car in a given direction from a given floor, means to count the number of trips from the given floor by the assigned car, and means permitting the assigned car to initiate its travel in the given direction from other than the given floor when the number of trips registered by said counting means attains a predetermined level.

7. In an elevator control system first means automatically causing a car to initiate its travel from a given floor, means to count the number of car trips from the given floor, and means automatically releasing the car from said first means to permit it to travel from other than the given floor when said counting means attains a predetermined number of car trips.

8. In an elevator system including a group of cars serving a number of floors, condition responsive means assigning a car of said group for special service at a single given floor, means automatically measuring the amount of special service provided by said assigned car, and means automatically releasing said assigned car from special service at the given floor in response to said measuring means.

9. In an elevator system means operating the system in one service pattern, means operating the system in a second service pattern and means counting the number of trips made while operating in said one service pattern and shifting the system to said second service pattern when that number attains a predetermined magnitude.

10. In an elevator system a group of cars, a plurality of floors served by said cars, means individual to each of a plurality of said cars for automatically assigning its car to park at a given floor, means requiring assigned cars to initiate their travel in a preselected direction from their parking floors, and means rendering said cars nonresponsive to all hall calls while they are assigned.

11. In an elevator system serving a plurality of floors, means responsive to a predetermined condition for automatically parking a car at a given floor, means requiring said parked car to initiate its travel in a preselected direction from said given floor, hall call registering means, and means operative while said parking means is operative for automatically rendering said car nonresponsive to all hall calls.

12. In an elevator control system automatic means responsive to a predetermined condition for selecting a car, means for parking the selected car at a given floor, hall call registering means, and means operative while said car is selected for rendering said car nonresponsive to all hall calls.

13. In an elevator system a car, a plurality of floors including a terminal floor served by said car, means for registering hall calls, means for registering car calls, means responsive to a predetermined condition for automatically assigning the car to park at a given floor, means operative while said car is assigned for rendering said car nonresponsive to all hall calls, and car call responsive means for said assigned car.

14. An elevator system as defined in claim 13 wherein said assigning means assigns the car to park at other than said terminal floor.

15. An elevator system as defined in claim 13 including means maintaining the door of the parked car closed until a given instant.

16. In an elevator system a timer, means responsive to said timer for selecting a car, means for parking the selected car at a preselected floor, hall call registering means, and means operative while said car is selected for rendering said car nonresponsive to all hall calls.

17. An elevator serving a plurality of floors, timing means influencing the demand for service at one or more of said floors, means shifting the service pattern of said elevator, and means synchronizing the operation of said service shifting means with said timing means.

18. An elevator serving a plurality of floors, timing means tending to influence an increase of the demand for service at a given one of said floors during a certain period, means providing special elevator service to said given floor, and means synchronized with said timing means to operate said special service means during said period of anticipated increased demand.

19. An elevator serving a plurality of floors, timing means tending to influence an increase of the demand for service at a given floor at a certain instant, and elevator control means synchronized with said timing means to provide special service at said given floor in anticipation of said increased demand at said instant.

20. An elevator system including a car serving a number of floors, timing means influencing the demand for service at one of said floors, means establishing a plurality of primary operating programs for said car, and means establishing a secondary operating program for said car operative during a primary operating program and synchronized in its operation with said timing means.

21. An elevator system in accordance with claim 20 wherein said secondary operating program comprises first means rendering said car nonresponsive to all hall calls prior to an anticipated increase in service demand at a floor subject to said timing means, means for eliminating the current service demand from within said car by responding to car calls during an interval between the operation of said first means and said anticipated increase, means parking said car at the floor when said increase is anticipated, means maintaining the door to said parked car closed, means opening the door to said parked car at the time said increase in service is anticipated.

22. An elevator system including a group of cars serving a number of floors, timing means influencing the demand for service at one of said floors, means establishing a primary operating program for said group, and means establishing a secondary operating program for an individual car of said group operative during a primary operating program and synchronized in its operation with said timing means.

23. An elevator system including a group of cars serving a number of floors, timing means influencing the demand for service at one of said floors, means establishing a primary operating program for said group, and means establishing a secondary operating program for at least one and less than all of the cars of said group operative during a primary operating program and synchronized in its operation with said timing means.

24. In an elevator system including a group of cars serving a number of floors, means assigning a car of said group for loading at a given floor, means counting the number of trips taken by the assigned car from its given floor, means reducing the service to the given floor by cars of the group other than a car assigned thereto during the period of assignment, and means releasing the car from its assigning means in response to said counting means.

25. In an elevator system including a group of cars serving a number of floors, means automatically assigning a car of said group for special service, to a given floor, means automatically measuring the amount of special service provided by the car at its given floor, means automatically reducing the service to the given floor by cars of the group other than a car assigned thereto during the period of assignment, and means automatically releasing the car from its assigning means in response to said measuring means.

26. In an elevator system including a group of cars serving a plurality of floors, means assigning a car of said group to provide special service to a given floor, means preventing all cars of the group but cars assigned to the given floor from responding to hall calls at the given floor, means counting the number of trips by the assigned car from the given floor, and means releasing the car from its assigning means when said count attains a predetermined number.

27. In an elevator system including a group of cars serving a plurality of floors, means assigning a car of said group to provide special service to a given floor, means preventing all cars of the group but cars assigned to the given floor from responding to all hall calls at the given floor, and means preventing assigned cars from responding to all hall calls at other than said given floor.

28. In an elevator system serving a number of floors, a car, a hall call registering means, means to cancel the hall call registration in response to the stopping of a car at a floor at which a call is in registration, means assigning said car to provide special service to a given floor, means to condition the assigned car to be nonresponsive to all hall calls at other than said given floor, means to maintain all registered hall calls in registration when the conditioned car stops at a floor other than said given floor at which a hall call is in registration.

29. In an elevator system serving a number of floors, a car, means assigning said car to provide special service to a given floor, hall call registering means, means to condition the car while assigned to be nonresponsive to all hall calls at other than said given floor, means to maintain all registered hall calls in registration at floors other than the given floor when the conditioned car stops at those floors, and means to cancel hall calls registered at the given floor in response to the conditioned car.

30. In an elevator system serving a number of floors, a car, a hall call registering means at each of a plurality of floors, a car travel indicator at each of a plurality of floors, means to cancel the hall call registration in response to the stopping of a car at a floor at which a call is in registration, means to operate the indicator at a floor at which a call is in registration in response to the car, means assigning said car to provide special service to a given floor, means to condition the car while assigned to be nonresponsive to all hall calls at other than said given floor, means to maintain all of said hall calls in registration when the conditioned car stops at a floor at which a call is in registration, and means to prevent the operation of said indicator in response to the conditioned car.

31. In an elevator system serving a plurality of floors means assigning a car to park at a given floor, means for rendering said assigned car nonresponsive to all hall calls, a car travel indicator for a given direction at each of a plurality of floors other than said given floor, and means for rendering said car travel indicators nonresponsive to travel of said assigned car in said given direction.

32. In an elevator system serving a plurality of floors means assigning a car to park at a given floor, means for rendering said assigned car nonresponsive to hall calls, car travel indicators at a plurality of floors, means for operating said indicator at said given floor in response to said car, and means for rendering said car travel indicators for a given direction nonresponsive to travel of said assigned car in said given direction at other of said plurality of floors.

33. In an elevator system including a group of cars serving a number of floors, timing means, means establishing a first operating program, means establishing a second operating program, service measuring means for said system, and means shifting said system from said first operating program to said second operating program when a predetermined level of service exists during a certain period of the operation of said timing means.

34. An elevator system serving a plurality of floors, first means establishing a first operating program for said elevator system, a timing means, a plurality of second operating program controls each of which when effective determines the operating pattern of the elevator system during respective periods defined by said timing means, service measuring means for said elevator system, and means responsive to the presence of a predetermined service level during a certain period of the operation of said timing means which shifts control of said elevator system from said first means to the one of said second operating program controls effective at that period.

35. In an elevator system including a group of cars serving a group of floors, control means for said group of cars providing an operating pattern therefore, timing means influencing the service demand at a given floor, means synchronized with said timing means to select an individual car for special service at said given floor for a period of anticipated increased service demand, means to terminate the special service to said given floor and control the selected car by said control means upon the rendering of a predetermined amount of service, means to reduce the service to the given floor by other than the selected car of the group, means to reduce the service of the selected car to floors other than the given floor.

36. In an elevator system including a group of cars serving a structure, first timing means influencing the service demand in said structure, dispatch timing means defining dispath intervals and issuing signals which activate car travel in a given direction when it has reached a given point in an interval, and means responsive to said first timing means altering said dispatch interval of said dispatch timing means.

37. In an elevator control system, means counting the number of trips made by a car to a given floor, and timing means defining a period coincident with at least a portion of said trips and resetting said counting means upon the expiration of said period.

38. In an elevator system including an elevator car, first means to control the operation of said car in one mode, second means to control the operation of said car in a second mode, means for counting the performance of a given function by said car while operating under control of the first means, and means responsive to a given plurality of functions as measured by said counting means for placing said car under control of said second means.

39. A system as defined in claim 38 wherein said given function is a given car travel pattern.

40. In an elevator system including a plurality of elevator cars, first means to control the operation of said cars in one mode, second means to control the operation of said cars in a second mode, and means to switch control of said system from said first means to said second means in response to the presence of a predetermined number of cars in service.

41. In an elevator system including a plurality of elevator cars, means to assign a plurality of said cars to provide preferred service each to a respective landing, means to count the trips of each car serving its respective landing, and means for each car responsive to a predetermined number of counted trips to release that car from said preferred service.

42. In an elevator system serving a plurality of floors and including a car, means for assigning the car to serve a given floor, hall call registering means controlling said car and means rendering said car nonresponsive to all hall calls while it is assigned to serve said given floor.

43. In an elevator system for a structure having a first terminal floor, a second terminal floor and a plurality of floors intermediate said terminal floors, a plurality of elevator cars, motor means for moving each of the elevator cars relative to the structure to provide elevator service for the floors, timing means operable at predetermined periods of time, and control means cooperating with the motor means for moving the elevator cars and stopping the elevator cars at desired floors of the structure, said control means including first means for controlling the elevator cars for movement between said terminal floors and second means operative in response to said timing means at a first predetermined time and automatically effective during movement of a first one of said elevator cars toward the second terminal floor for stopping and reversing said elevator car at a predetermined one of said intermediate floors and third means operative in response to said timing means at a second predetermined time and automatically effective during movement of said first elevator car toward the second terminal floor for stopping and reversing said elevator car at a second predetermined one of said intermediate floors.

44. In an elevator system for a structure having a first terminal floor, a second terminal floor and a plurality of intermediate floors positioned between the terminal floors, a plurality of elevator cars, motor means for moving each of the elevator cars relative to the structure to provide elevator service for the floors, and control means cooperating with the motor means for moving the elevator cars and stopping the elevator cars at desired floors of the structure, said control means comprising first call registering means for each of the intermediate floors operable for registering calls for elevator service toward the second terminal floor, second call registering means for each of the intermediate floors operable for registering calls for elevator service toward the first terminal floor, third call registering means operable for registering calls for each intermediate floor desired by passengers in each of the elevator cars, first means for moving the elevator cars between the terminal floors and stopping each of the elevators cars at each intermediate floor approached by the elevator car in response to a call registered by the registering means for the floor being approached by the elevator-car-to-be-stopped which may be served by such approaching elevator car, second means cooperating with the first means in response to the occurrence of a predetermined condition for conditioning a first one of the elevator cars on a plurality of first trips towards the second terminal floor to stop and reverse at a first one of the intermediate floors and means responsive to presence of a call registered by the third call registering means for rendering the second means ineffective for said conditioning.

45. In an elevator system for a structure having a first terminal floor, a second terminal floor and a plurality of intermediate floors positioned between the terminal floors, an elevator car, call registering means operable for registering calls for each intermediate floor desired by passengers in said elevator car, means responsive to a predetermined condition to cause said car to travel to a given intermediate floor and stop and reverse at said intermediate floor and means responsive to the presence of a call registered in said elevator car for rendering said stop and reversing means ineffective for said conditioning.

46. In an elevator system, a structure having a plurality of floors including a first terminal floor, a second terminal floor and a plurality of floors intermediate the terminal floors, an elevator car for transporting load to and from said floors, means mounting the elevator car for movement relative to the structure to serve the floors, and control means for controlling the elevator car for movement between the terminal floors in a first direction and in a second direction opposite to said first direction and for stopping the elevator car at desired floors of the structure to provide a first mode of elevator service for said floors, said control means including first means automatically effective in response to occurrence of a first predetermined condition for modifying the movement and the stopping of the elevator car to provide a second mode of elevator service for said floors, and second means responsive to the occurrence of a predetermined traffic condition at a predetermined one of said floors when the elevator car is conditioned to provide said second mode of service for rendering said first means ineffective further to condition the elevator car to provide said second mode of service at least until the occurrence of a second predetermined condition and for transferring the elevator car from said second mode to said first mode of service.

47. An elevator according to claim 17 including an entry, a door closing said entry, a door operator for moving said door between a closed and an open position, a door control for causing said operator to open said door as a car is stopped at floors, said means shifting the service pattern of said elevator including means stopping said car at a predetermined one of said floors intermediate the terminal floors of said plurality of floors, and means responsive during a predetermined time interval as determined by said timing means for inhibiting the opening of the door of said car when stopped at said predetermined floor in response to said service shifting means.

48. An elevator according to claim 17 including an entry, a door closing said entry, a door operator for moving said door between a closed and an open position, a door control for causing said operator to open said door as said car is stopped at floors, said means shifting the service pattern of said elevator including means stopping said car at a predetermined one of said floors intermediate said terminal floors of said plurality of floors, means responsive during a predetermined time interval defined by said timing means for inhibiting the opening of the door of said car when stopped at said predetermined floor in response to said service shifting means, and means responsive at a predetermined moment in time as defined by said timing means and the coincident presence of said car at said predetermined floor for causing said operator to open said door of said car.

References Cited

UNITED STATES PATENTS

| | | | |
|---|---|---|---|
| 2,688,383 | 9/1954 | Eames | 187—29 |
| 2,699,227 | 1/1955 | Eames | 187—29 |
| 2,862,576 | 12/1958 | Nikazy et al. | 187—29 |

ORIS L. RADER, *Primary Examiner.*

T. LYNCH, *Assistant Examiner.*